(12) United States Patent
Fuglsang et al.

(10) Patent No.: US 10,614,048 B2
(45) Date of Patent: Apr. 7, 2020

(54) TECHNIQUES FOR CORRELATING DATA IN A REPOSITORY SYSTEM

(71) Applicant: Oracle International Corporation, Redwood Shores, CA (US)

(72) Inventors: Dennis Fuglsang, Ballwin, MO (US); Andrey Ozerov, St-Petersburg (RU); David Keyes, Clinton, OH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 406 days.

(21) Appl. No.: 14/484,161

(22) Filed: Sep. 11, 2014

(65) Prior Publication Data

US 2015/0088841 A1    Mar. 26, 2015

Related U.S. Application Data

(60) Provisional application No. 61/880,817, filed on Sep. 20, 2013.

(51) Int. Cl.
*G06F 16/215* (2019.01)

(52) U.S. Cl.
CPC .................. *G06F 16/215* (2019.01)

(58) Field of Classification Search
CPC ......... G06F 17/30303; G06F 17/30598; G06F 17/30734
See application file for complete search history.

(56) References Cited

U.S. PATENT DOCUMENTS

| | | | |
|---|---|---|---|
| 7,966,291 B1 * | 6/2011 | Petrovic | G06F 17/30864 345/629 |
| 8,548,938 B2 | 10/2013 | Amaru | |
| 8,554,778 B2 | 10/2013 | Bal | |
| 8,595,246 B2 | 11/2013 | Fay | |

(Continued)

FOREIGN PATENT DOCUMENTS

| | | |
|---|---|---|
| EP | 1129403 A1 | 9/2001 |
| WO | 2000/022518 A1 | 4/2000 |

(Continued)

*Primary Examiner* — Usmaan Saeed
*Assistant Examiner* — William P Bartlett
(74) *Attorney, Agent, or Firm* — Kilpatrick Townsend & Stockton LLP

(57) ABSTRACT

Techniques are described for determining correlations between data in a repository system. The data may include information about corresponding to resources (e.g., an application, a process, a service, an endpoint, or a method) in a computing environment. A correlation between objects can indicate a similarity or a relationship based on one or more of the attributes of each object that is correlated. The repository system can store information about each object in a data structure, such as an entity, including the attributes about the object. The repository system can determine the relationships between entities based on correlations identified from the attributes of entities. The repository system can perform correlations based on groups of entities corresponding to a group of objects. Upon determining that two groups of entities match, the repository system can compare individual entities in the groups to identify correlations between individual entities corresponding to objects that are correlated.

14 Claims, 10 Drawing Sheets

(56) References Cited

U.S. PATENT DOCUMENTS

| | | | |
|---|---|---|---|
| 2005/0165752 A1* | 7/2005 | Mathew | G06F 17/30566 |
| 2005/0240615 A1* | 10/2005 | Barsness | G06F 17/30498 |
| 2009/0193046 A1* | 7/2009 | Desai | G06F 17/30315 |
| 2011/0295904 A1* | 12/2011 | Mohan | G06F 16/258 |
| | | | 707/802 |
| 2013/0246215 A1 | 9/2013 | Faith | |
| 2014/0012818 A1 | 1/2014 | Kaszynski | |
| 2014/0012820 A1 | 1/2014 | Kapkowski | |
| 2016/0117349 A1* | 4/2016 | Segaran | G06F 17/30303 |
| | | | 707/692 |

FOREIGN PATENT DOCUMENTS

| | | |
|---|---|---|
| WO | 2008/094803 A1 | 8/2008 |
| WO | 2012/071656 A1 | 6/2012 |

\* cited by examiner

TECHNIQUES FOR CORRELATING DATA IN A REPOSITORY SYSTEM

CROSS-REFERENCES TO RELATED APPLICATIONS

The present application claims priority and benefit from U.S. Provisional Application No. 61/880,817, filed Sep. 20, 2013, entitled "CONFIGURABLE CORRELATION ENGINE FOR A REPOSITORY SYSTEM," the entire contents of which are incorporated herein by reference for all intents and purposes.

TECHNICAL FIELD

The present disclosure relates generally to computing systems and more generally to techniques for correlating data in a repository system.

BACKGROUND

Repository systems can perform various functions including managing information about resources or objects (e.g., an application, a process, a service, or an endpoint) in a computing environment. Repository systems may perform correlation on stored information to determine relationships between resources or objects. Some repository systems may determine relationships to identify duplicate data that can be reduced or eliminated to reduce use of storage and/or to improve efficiency for retrieval of information.

The correlation methodologies implemented by some repository systems identify duplicate data by comparing each pair of resources or objects (e.g., pair-wise comparison). In a repository system storing information about many objects and/or resources, such techniques may demand the use of many computing resources to perform the comparison for each pair of resources or objects. Further, these correlation strategies are not capable of identifying meaningful relationships between groups of resources or objects.

BRIEF SUMMARY

The present disclosure relates generally to techniques for determining correlations between data in a repository system. A repository system may store data, which includes information about objects in a computing environment and attributes of those objects. Objects can include an application, a process, a service, an endpoint device, a method, a resource, or combinations thereof, which may be identifiable in a computing environment. The repository system may determine a correlation (e.g., a similarity or a relationship) between different objects based on the stored data corresponding to those objects. The repository system may use the correlations to manage data corresponding to those correlations. One or more attributes in the data corresponding to objects may be compared to identify a correlation. In some embodiments, the data corresponding to objects may be associated as a group corresponding to a group associated with those objects. A group of objects may be identified based on one or more attributes in the data corresponding to the objects. The repository system may determine a correlation between data for objects in different groups based upon identifying a correlation between attributes of the groups with which those objects are associated.

In certain embodiments, the repository system can store information about objects including their attributes in various different data structures ("entities"). Information about an object may be stored in one or more entities within the repository. For example, an entity may store information about one or more attributes of an object. A single entity may store information about one or more objects in a computing environment. An entity may be associated with an entity type. In some embodiments, for an entity storing information for one or more objects, an entity type may be associated with the entity corresponding to one or more types of the one or more objects. A type of an object may be based on information related to the object such as an attribute of the object, a function associated with the object, a group to which the object belongs, or combinations thereof. The repository system can retrieve at least one entity storing information for an object based on an object and/or a type of object requested by a user.

In some embodiments, objects can be associated as a group of objects based on a relationship between the objects. A relationship between objects can be based on a relationship between an attribute corresponding to the data for each of those objects. For example, a group of objects, such as a domain may be defined based a relationship between objects based on one or more attributes in an area of interest (e.g., a domain) corresponding to data of those objects. In some embodiments, objects can be associated as a group based on a model. A model may be defined based on a relationship of one or more attributes. In some embodiments, an entity may be used to store data for one or more attributes of a group of objects. The entity for a group of objects may include data indicating a relationship between attributes in data corresponding to objects in the group.

In certain embodiments, the repository system may associate with objects with a group based on a correlation between those objects. A correlation between objects may be based on identification of a similar or identical attribute in the data corresponding to those objects. To identify a correlation between objects, the repository system can first perform processing to determine a correlation between data corresponding to groups of objects and then determine whether a correlation exists between data corresponding to individual objects associated with the groups of objects that have a correlation with each other. In this manner, the repository system can reduce processing time to process the data that may be stored in the repository system for many objects. By determining a correlation between data corresponding to a group of objects, the repository system can reduce or eliminate performing pair-wise comparisons of data corresponding to objects to identify correlations.

In certain embodiments, a group of objects may also be correlated to other groups of objects by comparing data corresponding to the groups to data stored in the repository for the other groups of objects. Data corresponding to a group of objects may include information descriptive of one or more attributes of the group. In one example, to determine a correlation between two groups of objects, one or more attributes in the data associated with each of the two groups may be compared to determine a correlation between those groups. Upon determining a correlation between two groups of objects, data corresponding to the individual objects in those two groups may be compared to determine whether such data for an individual object in one of the two groups is correlated to data corresponding to an object in the other of the two groups. Upon identifying a correlation between objects of the correlated groups of objects, data corresponding those correlated objects may be merged if similar or related, or added into one of the correlated group of objects.

In certain embodiments, to the repository system can perform an action (e.g., merge operation or an update operation) with respect to data corresponding one or more objects in one group of objects (e.g., a source group of objects) correlated to one or more objects in another group of objects (e.g., a destination group of objects). The data corresponding to the source group of objects may be stored by an external data source (e.g., a source). The data corresponding to the destination group of objects may be stored by the repository system. The actions performed by the repository system may enable the data corresponding to the destination group of objects to be updated with new or different information obtained from data corresponding to the source group of objects. In one example, to perform an update to the data corresponding to the destination group of objects, the repository system may update the data corresponding to an object in the destination group of objects with data corresponding to one or more objects in the source group of objects that are new or different from an existing object in the destination group of objects. The data for the object in the source group of objects may be updated based on determination that the object has a correlation with at least one object in the destination group of objects.

In certain embodiments, one or more techniques are provided for determining correlations between data in a repository system. One such technique can be a method, which can be performed by a computing system including a repository system. The computing system can include one or more computing devices (e.g., a server computer). The computing system can identify one or more groups of source entities from a plurality of entities in a source repository system. A source entity can be an entity that resides in a source repository system. The computing system can access one or more groups of destination entities in a destination repository system. A destination entity can be an entity that resides in the destination repository system. The computing system can determine whether a group of source entities from a source repository system has a correlation with a group of destination entities. Upon determining that a group of source entities has a correlation with a group of destination entities, for each source entity in the identified group of source entities that has a correlation with the group of destination entities, the computing system can update the destination repository system to include each source entity that is not a duplicate of or related to a destination entity in the group of destination entities. However, for each source entity in the group of source entities that has a correlation with the group of destination entities, the computing system can perform a corresponding action to (e.g., delete or discard) the source entity to prevent the source entity from being included in the group of destination entities.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The following detailed description together with the accompanying drawings will provide a better understanding of the nature and advantages of the present invention.

DETAILED DESCRIPTION

Figure 1:
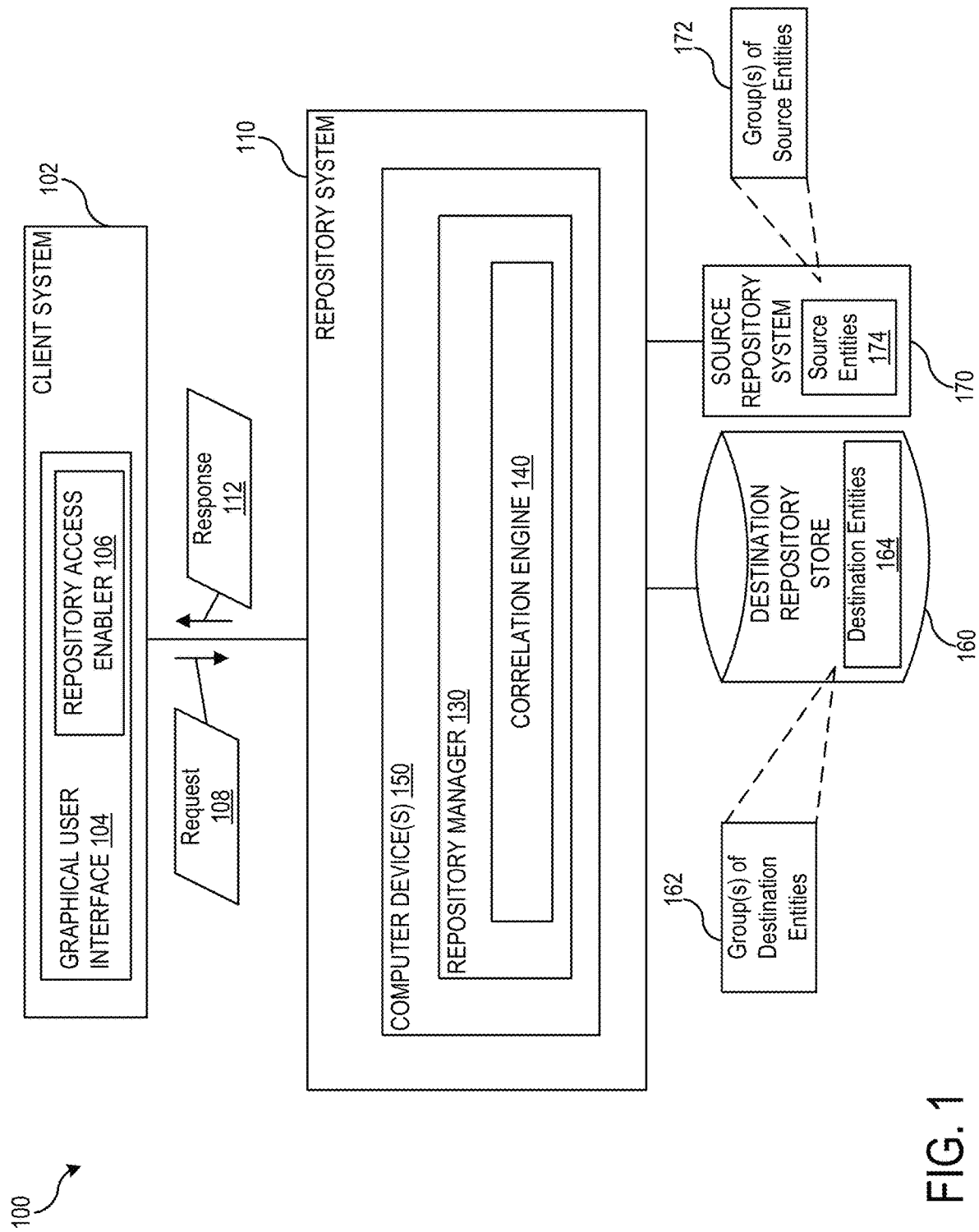
FIG. 1 shows a computing environment according to an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

The present disclosure relates generally to techniques for determining correlations between data in a repository system. A repository system may store data, which includes information about objects in a computing environment and attributes of those objects. Objects can include an application, a process, a service, an endpoint device, a method, a resource, or combinations thereof, which may be identifiable in a computing environment. The repository system may determine a correlation (e.g., a similarity or a relationship) between different objects based on the stored data corresponding to those objects. The repository system may use the correlations to manage data corresponding to those correlations. One or more attributes in the data corresponding to objects may be compared to identify a correlation. In some embodiments, the data corresponding to objects may be associated as a group corresponding to a group associated with those objects. A group of objects may be identified based on one or more attributes in the data corresponding to the objects. The repository system may determine a correlation between data for objects in different groups based upon identifying a correlation between attributes of the groups with which those objects are associated.

In certain embodiments, the repository system can store information about objects including their attributes in various different data structures ("entities"). Information about an object may be stored in one or more entities within the repository. For example, an entity may store information about one or more attributes of an object. A single entity may store information about one or more objects in a computing environment. An entity may be associated with an entity type. In some embodiments, for an entity storing information for one or more objects, an entity type may be associated with the entity corresponding to one or more types of the one or more objects. A type of an object may be based on information related to the object such as an attribute of the object, a function associated with the object, a group to which the object belongs, or combinations thereof. The repository system can retrieve at least one entity storing information for an object based on an object and/or a type of object requested by a user.

In some embodiments, objects can be associated as a group of objects based on a relationship between the objects. A relationship between objects can be based on a relationship between an attribute corresponding to the data for each of those objects. For example, a group of objects, such as a domain may be defined based a relationship between objects based on one or more attributes in an area of interest (e.g., a domain) corresponding to data of those objects. In some embodiments, objects can be associated as a group based on a model. A model may be defined based on a relationship of one or more attributes. In some embodiments, an entity may be used to store data for one or more attributes of a group of objects. The entity for a group of objects may include data indicating a relationship between attributes in data corresponding to objects in the group.

In certain embodiments, the repository system may associate with objects with a group based on a correlation between those objects. A correlation between objects may be based on identification of a similar or identical attribute in the data corresponding to those objects. To identify a correlation between objects, the repository system can first perform processing to determine a correlation between data corresponding to groups of objects and then determine whether a correlation exists between data corresponding to individual objects associated with the groups of objects that have a correlation with each other. In this manner, the repository system can reduce processing time to process the data that may be stored in the repository system for many objects. By determining a correlation between data corresponding to a group of objects, the repository system can reduce or eliminate performing pair-wise comparisons of data corresponding to objects to identify correlations.

In certain embodiments, a group of objects may also be correlated to other groups of objects by comparing data corresponding to the groups to data stored in the repository for the other groups of objects. Data corresponding to a group of objects may include information descriptive of one or more attributes of the group. In one example, to determine a correlation between two groups of objects, one or more attributes in the data associated with each of the two groups may be compared to determine a correlation between those groups. Upon determining a correlation between two groups of objects, data corresponding to the individual objects in those two groups may be compared to determine whether such data for an individual object in one of the two groups is correlated to data corresponding to an object in the other of the two groups. Upon identifying a correlation between objects of the correlated groups of objects, data corresponding those correlated objects may be merged if similar or related, or added into one of the correlated group of objects.

In certain embodiments, to the repository system can perform an action (e.g., merge operation or an update operation) with respect to data corresponding one or more objects in one group of objects (e.g., a source group of objects) correlated to one or more objects in another group of objects (e.g., a destination group of objects). The data corresponding to the source group of objects may be stored by an external data source (e.g., a source). The data corresponding to the destination group of objects may be stored by the repository system. The actions performed by the repository system may enable the data corresponding to the destination group of objects to be updated with new or different information obtained from data corresponding to the source group of objects. In one example, to perform an update to the data corresponding to the destination group of objects, the repository system may update the data corresponding to an object in the destination group of objects with data corresponding to one or more objects in the source group of objects that are new or different from an existing object in the destination group of objects. The data for the object in the source group of objects may be updated based on determination that the object has a correlation with at least one object in the destination group of objects.

FIG. 1 shows a computing environment 100 according to an embodiment of the present invention. Specifically, computing environment 100 can determine a correlation between data about objects in a computing environment. As depicted, the computing environment 100 can include a client system 102, a repository system 110 (e.g., "a destination repository system"), a source repository system 170, and one or more data stores including a repository store 160 (e.g., "a destination repository store").

In the computing system 100, information (e.g., metadata) about an object can be stored in a data structure ("an entity"). An entity can include information such as a location in storage (e.g., a data store) of one or more objects, an identifier of the one or more objects, a type of the one or more objects, and a relationship of the one or more objects to other objects. An entity may be without restriction a linked list, a record, a hash table, an array, or any memory or data structure. Information about an object may be stored in one or more entities within the repository. A single entity may store information about one or more objects in a computing environment. An entity may store information such as one or more attributes about an object, one or more functions associated with an object, one or more groups of objects to which an object is associated, or combinations thereof.

An entity may be associated with an entity type, which corresponds to one or more types of objects. A type of an object may be based on an attribute of an object, a function associated with an object, information about the object, a group to which an object belongs, a type of resource, a type of device, or combinations thereof. The repository system can retrieve at least one entity based on an object and/or a type of object requested by a user.

The source repository system 170 can store information about one or more objects harvested from other repository systems. In some embodiments, the source repository system 170 can store information about one or more objects in one or more entities (e.g., source entities 174). The information stored by the source repository system 170 can be managed using a data store. The destination repository store 160 can store information about one or more objects managed by the repository system 110. In some embodiments, the repository system 110 can store information about one or more objects in one or more entities (e.g., destination entities 164) in the destination repository store 160. The correlation techniques described herein may be implemented by the repository system 110 to combine information about one or more objects stored by the source repository system 170 with information stored by the destination repository store 160. The manner in which the source entities 174 and the destination entities 164 are stored is described below with reference to FIG. 3.

It should be appreciated that various different system configurations are possible, which may be different from the computing environment 100. The embodiment shown in the figure is thus one example of a computing system for implementing an embodiment system and is not intended to be limiting. For purposes of illustration, specific embodiments are described herein for techniques for determining correlations between one or more of the source entities 174 managed by the source repository system 170 and one or more of the destination entities 164 managed by the repository system 110.

In some embodiments, the client system 102, the repository system 110, and the source repository system 170 can be implemented in different computing systems. In some embodiments, the client system 102, the repository system 110, the source repository system, 170, or combinations thereof may be implemented in a single computing system. The client system 102, the repository system 110, and the source repository system 170 can communicate with each other via one or more networks (not shown). Examples of communication networks may include the Internet, a mobile network, a wireless network, a cellular network, a local area network (LAN), a wide area network (WAN), other communication networks, or combinations thereof The destination repository store 160 and/or storage for the source repository system 170 can be implemented using any type of persistent storage device, such as a memory storage device or other computer-readable storage medium. In certain embodiments, the destination repository store 160, the source repository system 170, or both can be implemented using a database (e.g., a document database, a relational database, or other type of database), a file store, a combination thereof, or some other information store.

The source repository system 170 may be implemented by a computing system. The source repository system 170 may be implemented using hardware, firmware, software, or combinations thereof. The source repository system 170 may manage (e.g., create, read, update, or delete) source entities, e.g., the source entities 174. The source repository system 170 may be implemented using a computing system such as a personal digital assistant (PDA), a tablet computer, a laptop computer, a desktop computer, a wearable computer, a pager, etc. The source repository system 170 can include one or more memory storage devices and one or more processors. A memory storage device can be accessible to the processor(s) and can include instructions stored thereon that, when executed by the processor(s), cause the processor(s) to implement one or more operations disclosed herein. In various embodiments, the source repository system 170 may be configured to execute and operate applications such as a web browser, proprietary client applications, or the like.

The source repository system 170 may identify an association of the source entities 174 with one or more groups of source entities, e.g., a group of source entities 172. Each entity in a group of source entities 172 may include one or more attributes (e.g., an identifier) of an object that are similar or related to another object corresponding to an entity in the group of source entities 172. In some embodiments, the attributes of objects that are similar or related may be determined using a hierarchical metadata model. In one example, the group of source entities 172 can correspond the source entities 174, which are associated with a correlation identifier. The correlation identifier can be based on one or more attributes of an object indicated by an entity. Each source entity of the group of source entities 172 can include one or more other attributes that are not identical or related.

The repository system 110 may be implemented using a computing system. The repository system 110 may manage (e.g., create, read, update, or delete) destination entities, e.g., the destination entities 164 in the destination repository store 160. The destination repository system 110 may be implemented in hardware, firmware, software, or combinations thereof. For example, the repository system 110 can be implemented using one or more computer devices 150 (e.g., a server computer), which can perform operations for the repository system 110. For example, the repository system 110 may be implementing using a PDA, a tablet computer, a laptop computer, a desktop computer, a wearable computer, a pager, or combinations thereof. The destination repository system 110 can include one or more memory storage devices and one or more processors. A memory storage device can be accessible to the processor(s) and can include instructions stored thereon that, when executed by the processor(s), cause the processor(s) to implement one or more operations disclosed herein. In various embodiments, the repository system 110 may be configured to execute and operate applications such as a web browser, proprietary client applications, or the like.

In certain embodiments, the computer device 150 of the repository system 110 can communicate with a client (e.g., the client system 102) to receive one or more requests 108. For example, repository system 110 may receive a request from client 102 to determine a correlation between data corresponding to one or more objects stored by the source repository system 170 and data corresponding to one or more objects stored by the destination repository store 160. The request (e.g., a request 108) may indicate a type of correlation to be performed or a criterion (e.g., an attribute of an object or a type of an object) to use for identifying any correlations between objects. In some embodiments, a request may indicate a type of object, a group of objects, or an attribute of an object by which a correlation is to be performed. A request can be made to obtain information about previously identified correlations. In some embodiments, the repository system 110 may periodically or intermittently process any of the source entities 174 received from the source repository system 170 to determine whether any correlations exist between an object correspond to the source entities 174 and an object corresponding to any of the destination entities 164. The repository system 110 may provide one or more responses 112 to the client system 102. A response 112 may be sent in satisfaction of a request 108.

Figure 3:
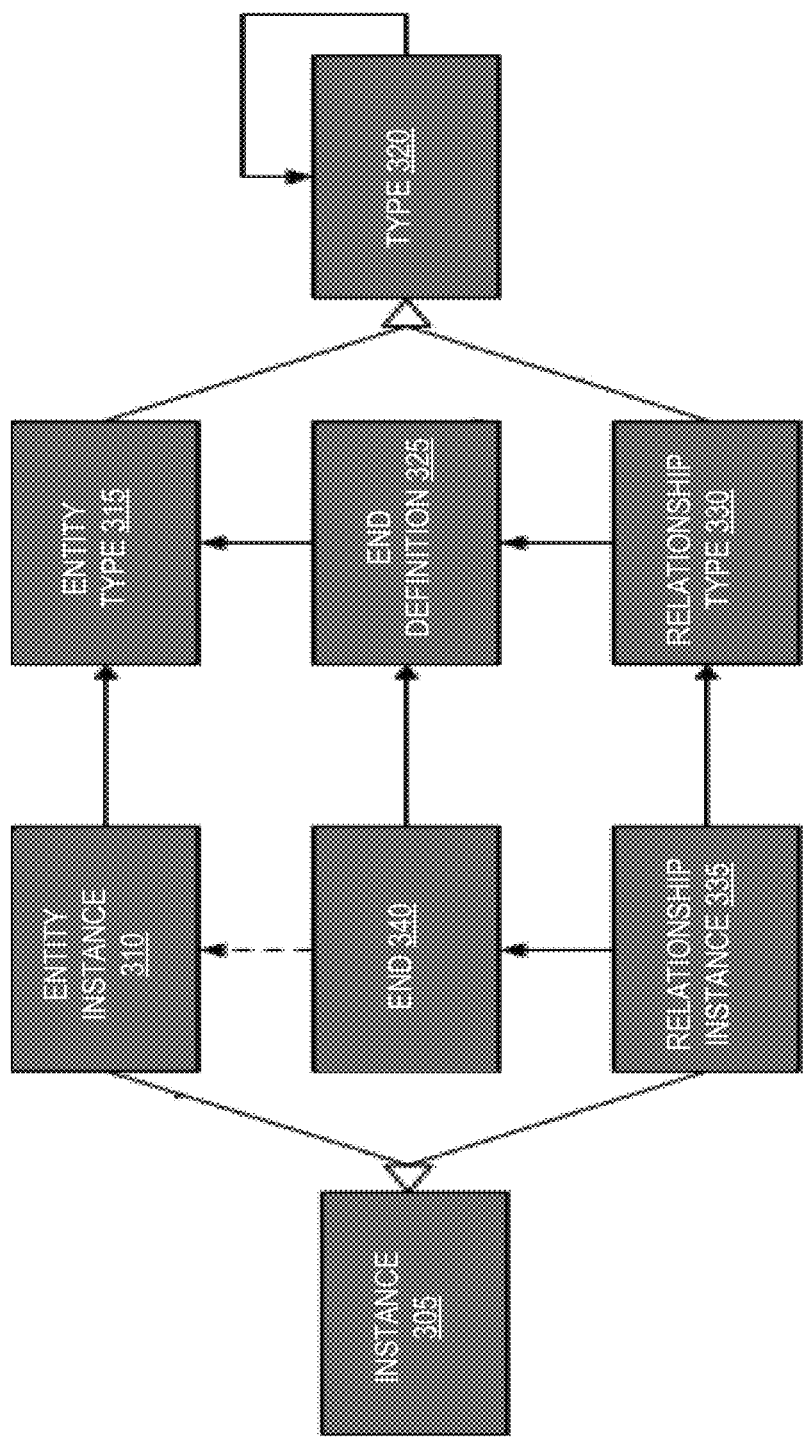
FIG. 3 shows a relationship between an entity and types of entities according to an embodiment of the present invention.
Figure 4:
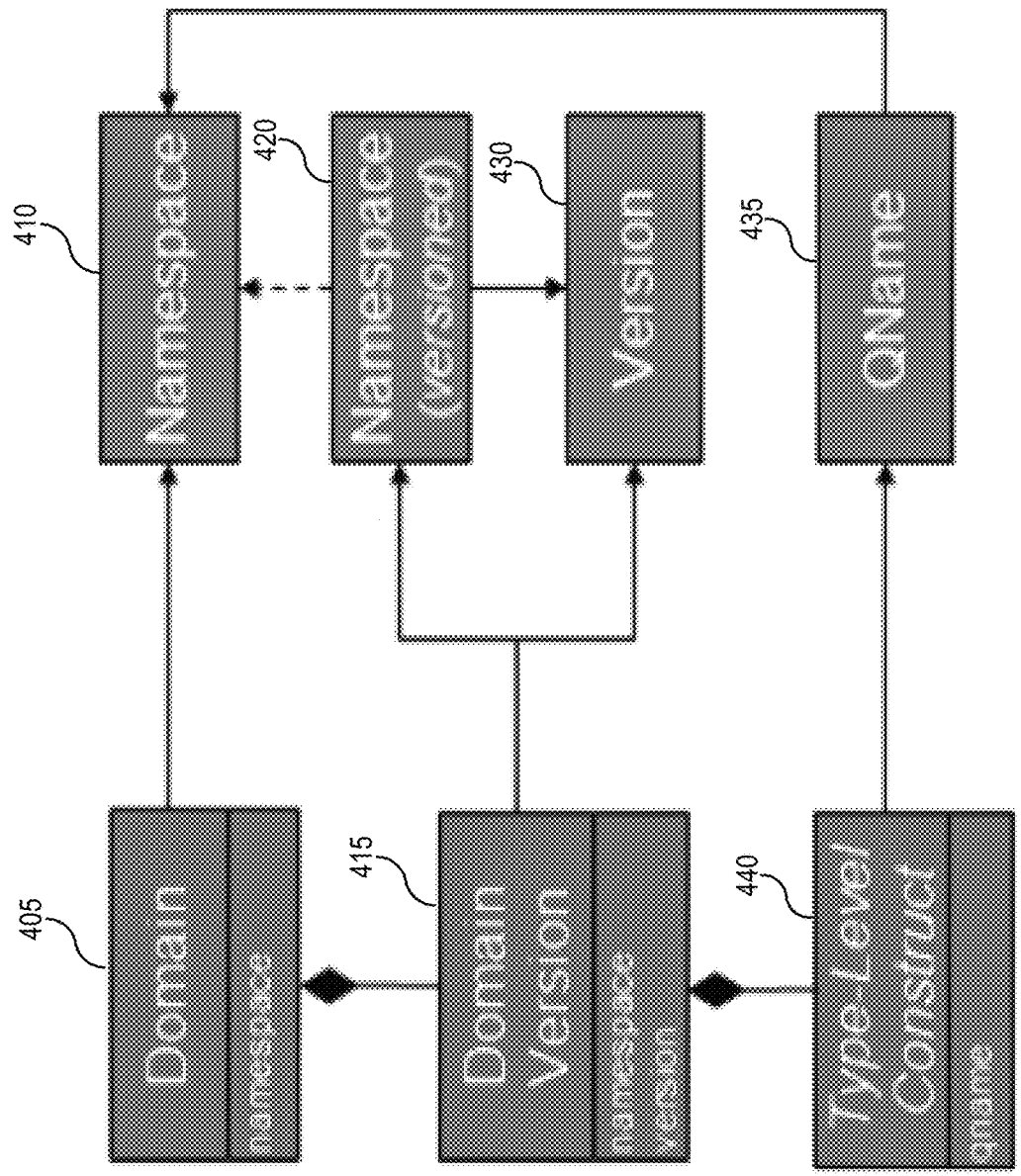
FIG. 4 shows a data structure of a domain and information stored in association with the domain according to an embodiment of the present invention.

In certain embodiments, the repository system 110 can determine an association of all or some of the destination entities 164 with one or more groups of destination entities, e.g., a group of destination entities 162. Each entity in a group of destination entities 162 may include one or more attributes (e.g., an identifier) of an object that are similar or related to another object corresponding to an entity in the group of destination entities 162. In one example, the group of destination entities 162 can correspond the source entities 164, which are associated with a correlation identifier. A correlation identifier can be based on one or more attributes of an object indicated by an entity. FIGS. 3 and 4 described below provide details about different techniques by which entities are managed in association with groups in the source repository system 170 and/or the destination repository system 110.

In certain embodiments, the computer device 150 can support execution or deployment of different types of applications to one or more client systems (e.g., the client system 102) in a distributed manner. For example, the computer device 150 can support the execution of one or more applications that can be accessed by one or more client systems, e.g., the client system 102. The applications can be provided to the client system 102 to enable a user to operate the repository system 110. The one or more applications can be accessed and operated via the client system 102. In certain embodiments, the computer device 150 can exchange communication with the client system 102 to provide on or more services to the client system 102.

The client system 102 (e.g., "a client") may be implemented using a computing system. For example, the client system 102 may be implemented using a PDA, a tablet computer, a laptop computer, a desktop computer, a wearable computer, a pager, etc. The client system 102 can include one or more memory storage devices and one or more processors. A memory storage device can be accessible to the processor(s) and can include instructions stored thereon that, when executed by the processor(s), cause the processor(s) to implement one or more operations disclosed herein. In various embodiments, the client system 102 may be configured to execute and operate a client application such as a web browser, proprietary client applications, or the like. The client applications may be accessible or operated via one or more network(s). In some embodiments, the client system 102 can be associated with or implemented in the repository system 110. The client system 102 may be implemented in hardware, firmware, software, or combinations thereof.

The client system 102 may be operated by a user to communicate a request, e.g., the request 108, to the repository system 110. The client system 102 may receive responses (e.g., the response 112) to a request (e.g., the request 108) from the repository system 110. The request 108 can indicate an action to be performed with respect to one or more groups of entities, such as the group of destination entities 162 and/or the group of source entities 172. For example, the request 108 can instruct the repository system 110 to perform a correlation between data corresponding to one or more objects stored in a group of source entities 172 and data corresponding to one or more objects stored in a group of destination entities 162. The request 108 can include criteria indicating a type of correlation to identify or a type of correlation to be performed. In some embodiments, the criteria for performing the correlation may have been previously provided by the user. The request 108 can include criteria indicating one or more criterion for updating a group of destination entities (e.g., the group of destination entities 162) based on identification of a correlation. A criterion can indicate how duplicate or similar entities can be replaced or merged. Alternatively or additionally, the repository system 110 can perform correlation based on a default criterion. A default criterion may indicate that correlation is to be performed to identify a correlation between one or more source entities 174 in the source repository system 170 and one or more groups of destination entities 162.

In certain embodiments, the client system 102 can present a graphical user interface (GUI) 104 to facilitate communication with the repository system 110. The GUI 104 can include or implement a repository access enabler 106 to further assist the user in communicating the request 108 to the repository system 110. The repository access enabler 106 can present one or more GUIs that enable a user to communicate the request 108 to the repository system 110. Through the repository access enabler 108, a user can specify a criterion in the request 108. A criterion can be used to determine a correlation, can indicate a type of correlation to perform, and/or can indicate actions to be performed once a correlation is identified.

The repository access enabler 106 can enable users to perform actions such as searching, browsing, viewing, editing, and/or managing entities stored by the repository system 110 and/or accessible from the source repository system 170. The repository access enabler 106 can present information about an entity or a correlation provided in the response 112. In certain embodiments, the repository access enabler 106 can enable a user (e.g., an administrator) to specify a criterion to the repository system 110. Such criterion may define one or more groups of destination entities, e.g., the group of destination entities 162. In certain embodiments, the repository access enabler 106 can enable a user (e.g., an administrator) to specify a criterion to the repository system 110 for defining one or more groups of source entities, e.g., the group of source entities 172. Different types of groups of entities are described below with reference to FIGS. 3 and 4.

The computer device 150 can include or implement a repository manager 130 to manage information about objects in one or more groups of destination entities (e.g., the group of destination entities 162). In certain embodiments, the destination entities 164 may be stored according to a hierarchical metadata model derived from one or more formalized metadata models. For example, the destination entities 174 can be managed in groups based at least in part on grouping of data associated with a structure defined by a formalized metadata model (e.g., a hierarchical metadata model) or one or more attributes of entities. The repository manager 130 can generate a destination entity 164 for one or more objects that are identified in a computing environment. In certain embodiments, the repository manager 130 can generate destination entity 164 based on information about an object provided by a user via the client system 102.

The repository manager 130 may include a correlation engine 140 to determine a correlation between data corresponding to one or more objects in one or more source entities 174 and data corresponding to one or more objects in one or more destination entities 164. A correlation may be determined for a variety of reasons, such as in response to the request 108 or to manage information in the destination repository 160. A correlation may be determined based on consideration of factors including data comparability, data relevance, or data similarity. Entities may be compared directly to each other, as by pair-wise comparison with respect to one or more attributes. Entities may be compared based on their relationship in one or more groups. In certain embodiments, correlation engine 140 may associate objects to a group of objects based on similar or identical attributes in the data corresponding to the objects.

In certain embodiments, correlation engine 140 may compare data corresponding to the group of objects to data for other groups of objects based on comparison of one or more attributes in the data corresponding to the groups of objects being compared. A group of objects may correspond to a group of entities, which includes entities storing data corresponding to each object in the group of objects. Upon determining a correlation between a groups of objects, data for the individual objects in the correlated groups may be compared to determine whether such data for an individual object is correlated to data corresponding to objects in other correlated groups. Upon identifying such a correlation between individual objects between two compared groups of objects, the data corresponding to the correlated objects may be merged if similar or related, or added to one of the group of objects (e.g., a destination group of objects).

The correlation engine 140 can perform an action (e.g., a merge action or an update action) based on identifying a correlation between two groups of objects, each corresponding to a group of entities. Upon determining that the groups of objects have a correlation, the repository system can update the group of entities corresponding to those groups of objects having a correlation. The group of entities stored in the repository system 110 can be updated with data corresponding to objects in the group of entities stored by the source repository store 170. Entities in the group of entities in the source repository system 170 that are different or new from the entities in the destination repository store 160 are updated. The relationships of an updated entity may be updated as well to reflect a relationship to other entities in the source repository store 170. In some embodiments, attributes of two related entities may be merged such that a combined entity includes each distinct attribute from the two related entities. Entities that are identical may be discarded, but for any differences or relationships with other entities. By performing correlation between objects based on their association with a group, a repository system can reduce an amount of processing performed by pair-wise comparison between objects. Further, the repository system can reduce consumption of storage for entities that are related or similar.

Figure 2:
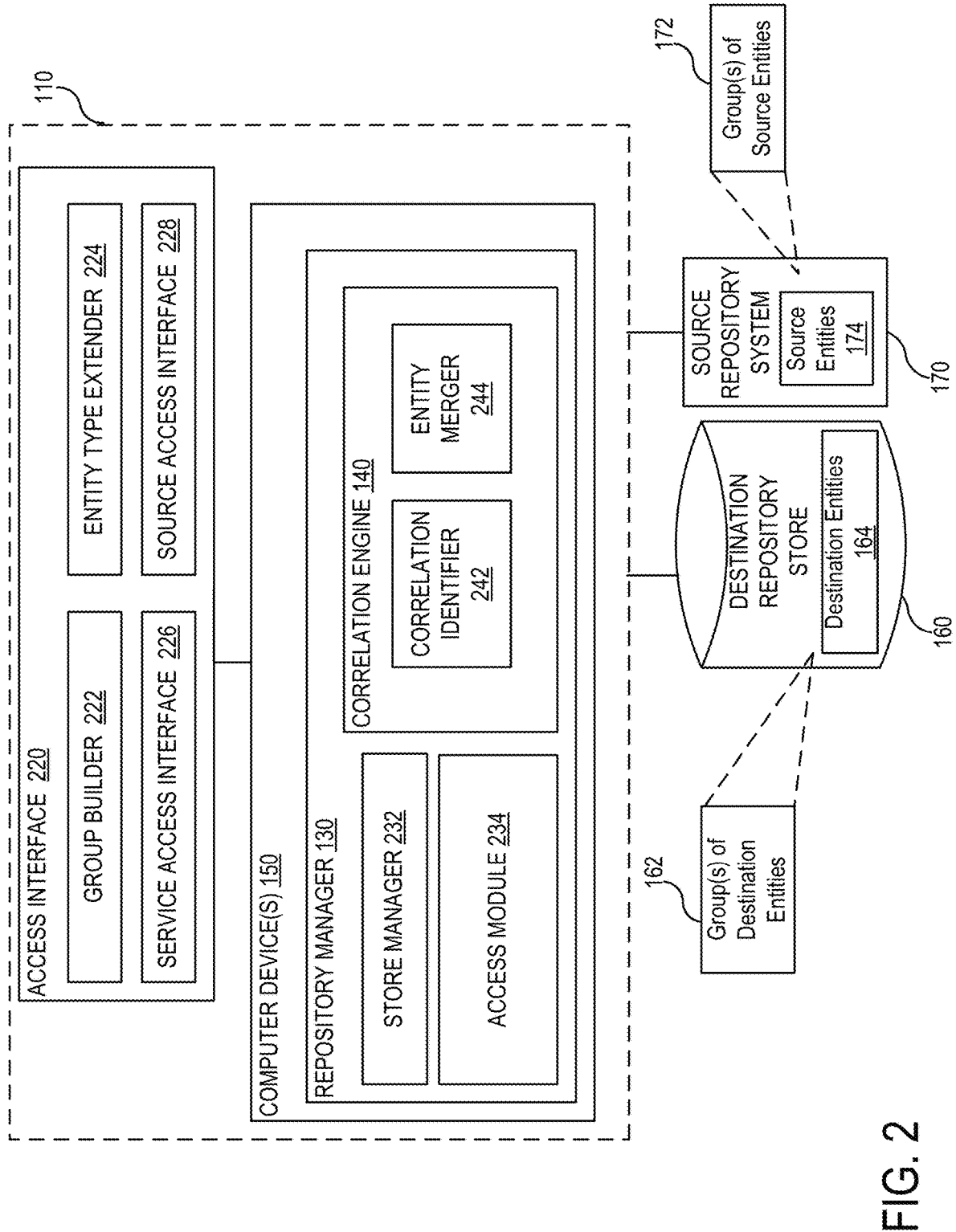
FIG. 2 shows a repository system according to an embodiment of the present invention.

FIG. 2 shows the repository system 110 of FIG. 1 according to an embodiment of the present invention. The repository system 110 may include elements described with reference to FIG. 1. The repository system 110 can include an access interface 220 and the computer device 150.

The repository system 110 can include or implement an access interface 220 enable communication between the repository system 110 and the client system 102. The access interface 220 can serve as a main point of entry to communicate with the repository system 110. The access interface 220 can enable a user to expand and utilize the repository system 110 without burdening the user for storage and management of data about resources and/or objects in a computing environment. For example, the access interface 220 can facilitate access to information (e.g. registries and factories) which allow for discovery, use, and specification of structures, definitions, and constructs for a hierarchical metadata model used for managing data about resources and/or objects. The access interface 220 can include one or more callable interfaces (e.g., an application programming interface or a service programming interface). The access interface 220 can include one or more functional blocks, modules, and/or interfaces that are configured to provide one or more functions to enable the client system 102 to operate the repository system 110. The access interface 220 may be implemented in hardware, firmware, software, or combinations thereof. The access interface 220 can include a group builder 222, an entity type extender 224, a service access interface 226, and a source access interface 228. In some embodiments, the access interface 220 can be included or implemented by the computer device 150.

The group builder 222 may provide an application interface that can receive requests to create, manage, update, and/or remove a group of entities (e.g., a domain of entities) in the repository system 110. The group builder 222 can receive one or more criterion for a group of entities. A criterion can indicate one or more attributes (e.g., a correlation identifier) of a group, such as types of resources/objects in the computing environment, a domain version, a domain namespace, or combinations thereof. The repository manager 130 can manage an association of one or more entities in a group based on a criterion. An example of information managed for a group of entities, such as a domain of entities, is described below with reference to FIG. 3.

The entity type extender 224 may provide an application interface that can receive requests to create, manage, modify, and/or remove a type structure used to store one or more attributes for entities manages by the repository system 110. The entity type extender 224 can receive one or more criterion indicating one or more attributes for an extended type of an entity. The extended type of an entity can provide data (e.g., attributes) in addition to the data that an entity type can provide about an entity. The entity type can be a data structure on which an entity is based. The additional data can include attributes about the type of resource of object stored for a type of entity. The entity type extender 224 can provide callable functions including creating, modifying, managing, and/or removing an extended type of an entity. A criterion can be provided to the repository manager 130 to manage the entities based on the extended type specified by the criterion.

The service access interface 226 may enable a computing device to interact with logic to access one or more services. For example, service access interface 226 may enable users to customize data stored by the repository manager 130 to be manipulated for an application. Applications may obtain data stored by the repository manager 130 in an application-specific manner (e.g., format or style), which may be different from the manner in which the data is stored by the repository manager 130.

The source access interface 228 may enable a computing device to communicate with one or more sources of information about objects. A source of information may include a source repository system (e.g., source repository system 170) that may store one or more source entities. A source may include a local data store accessible to computer device 150. Information obtained from a source may be obtained with a model that indicates a manner in which the information is stored. A source may be associated with a computing product and/or with a standards-compliant file, such as a Web Services Description Language (WSDL) file or a Business Process Execution Language (BPEL) file. A model associated with the information may be associated with product-specific projects in a developer tool. Information obtained via source access interface 228 may be processed and converted by the repository manager 130 to be stored in the destination repository store 160. Source access interface 228 may enable a user (e.g., a resource provider) to specify extension adapters defining one or more sources of data stores containing data to be managed by the repository manager 130.

The repository system 110 can be implemented as one or more functional blocks or modules configured to perform various operations for determining correlations between entities. The repository system 110 may include the repository manager 130. The repository manager 130 may include a store manager 232, an access module 234, and the correlation engine 140. The correlation engine 140 may include a correlation identifier 242 and an entity merger 244.

The repository manager 130 can process a request to determine correlation for a request (e.g., the request 108) received by the computer device 150. The repository manager 130 may process the request to determine the action(s) requested for one or more entities. The access module 234 may determine whether a user associated with the request has access to perform the requested action(s). Access module 234 may determine access to entities based on a role of the user for accessing the repository system 110. A user may be identified with a request based on associated with the client system 102. Access may be further determined with regard to each entity that is accessed to perform a correlation. Access may be determined for destination entities 164 and/or source entities 174. In some embodiments, access to an entity may be determined with respect to a group of entities (e.g., the destination group of entities 162 and/or the source group of entities 172) including the requested entity.

Store manager 232 can manage storage and retrieval of destination entities 164 in destination repository store 160. Based on the access permitted to a user, store manager 232 can retrieve one or more entities 164 and/or one or more groups of entities 162 requested to determine correlation with source entities 174. Store manager 232 can manage access and retrieval of source entities 174 from source repository system 170. In some embodiments, store manage 232 may communicate with source repository system 170 via source access interface 228. In some embodiments, store manager 232 can determine a group of entities (e.g., a group of source entities or a group of destination entities) based on one or more entity types. The group of entities may be identified by each entity in the group having a similar or related entity type. In some embodiments, store manager 232 can determine a group of entities (e.g., a group of source entities or a group of destination entities) based on an attribute corresponding to a domain of entities or a model of entities. Examples of a domain are described with reference to FIG. 4. Examples of a model are described with reference to FIG. 5.

Correlation identifier 242 may perform one or more operations to determine a correlation between entities, such as between one or more source entities 174 and one or more destination entities 164. For example, correlation identifier 242 may determine whether a group of source entities has a correlation with a group of destination entities. Correlation identifier 242 may perform one or more operations to determine a correlation, which may include applying one or more techniques described with reference to FIGS. 6 and 7. For example, correlation identifier 242 may determine a correlation when a group of source entities has a correlation with a group of destination entities based on an attribute (e.g., a correlation identifier) of the group of source entities matching an attribute of the group of destination entities.

Based on a determined correlation, entity merger 244 can determine whether one or more entities in two correlated groups are duplicates. For example, entity merger 244 can determine whether one or more entities in a group of source entities are duplicates of one or more entities in a group of destination entities that are correlated to the group of source entities. A duplicate may be identified by an entity in the group of source entities having an attribute that matches one or more attributes of an entity in the correlated group destination entities. A duplicate entity from the group of source entities may be merged with the duplicate entity in the group of source entities. In one example, a source entity may be merged with a duplicate destination entity when the source entity and the destination entity include different information. The destination entity may be updated to include information from the source entity that is not included in the destination entity. In some embodiments, when the source entity does not information that is different from what is included in the duplicate destination entity, the destination entity may be replaced by the source entity or vice versa. In the case when the correlated group of destination entities does not include an entity that is included in the correlated group of source entities, the entity may be added to the correlated group of destination entities. To change an entity in destination repository store 160, entity merger 244 may request store manager 232 to update the destination repository store 160. Entity merger 244 may request store manager 232 to perform operations to obtain information for one or more destination entities to determine their attributes. The results may be used to determine whether a destination entity is a duplicate of a source entity.

In some embodiments, entity merger 244 can determine whether a source entity includes information indicating a relationship with another source entity when the source entity is a duplicate of a destination entity. Upon determining that the source entity has a relationship with another source entity, entity merger 244 can determine whether the related source entity exists in a group of destination entities correlated to a group of source entities including the source entity being analyzed. If the related source entity exists in the correlated group of destination entities, then entity merger 244 can determine whether the related source entity is a duplicate of a destination entity in the correlated group of destination entities or contains different information from the destination entity in the correlated group of destination entities. Based on such a determination, the correlated group of destination entities may be updated with the related source entity. The correlated group of destination entities may be updated to reflect the relationship of the related source entity to the source entity, which is not a duplicate of any other destination entity in the correlated group of destination entities.

Figure 5:
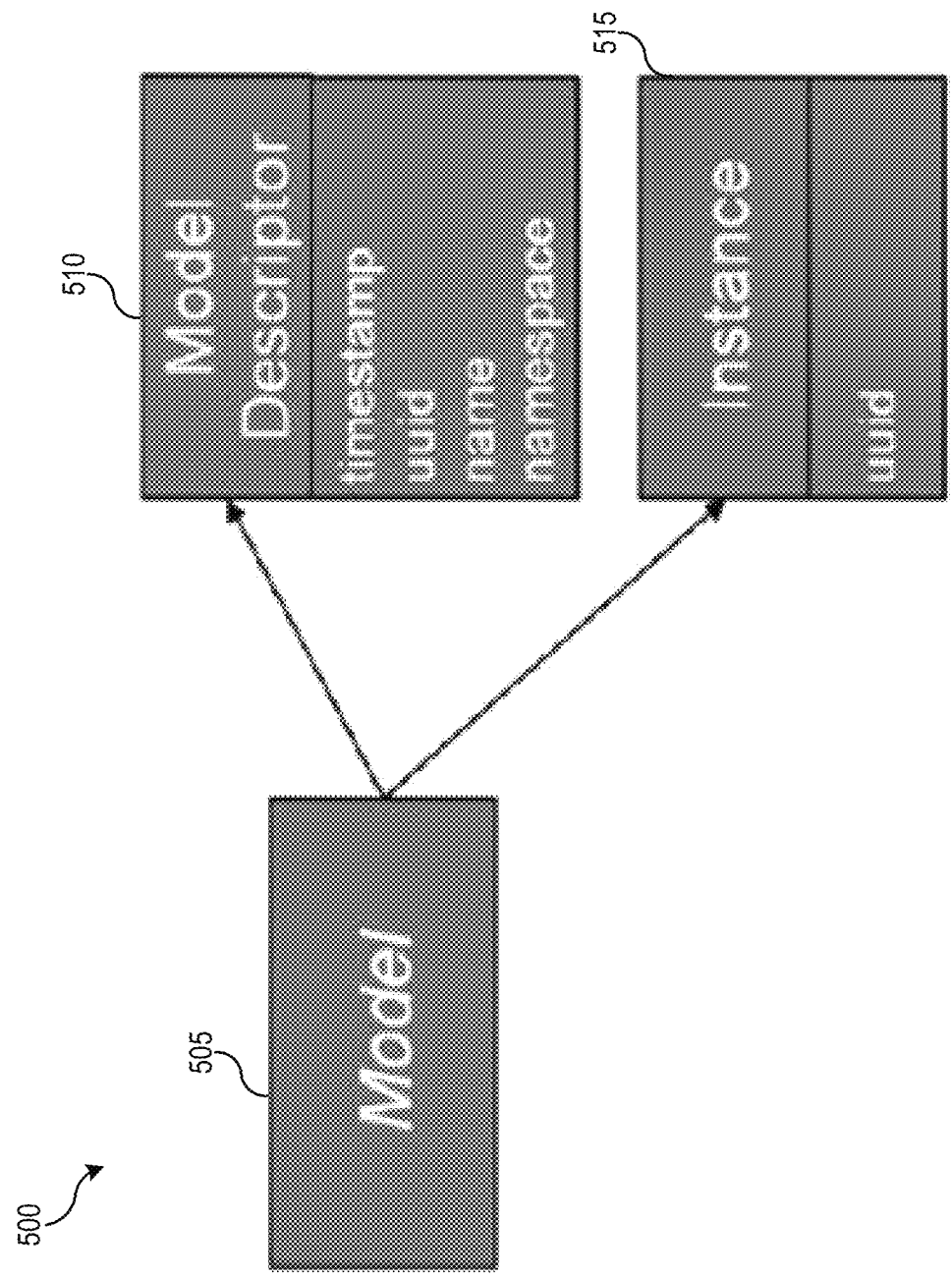
FIG. 5 shows a data structure of a model and information stored in association with the model according to an embodiment of the present invention.
Figure 7:
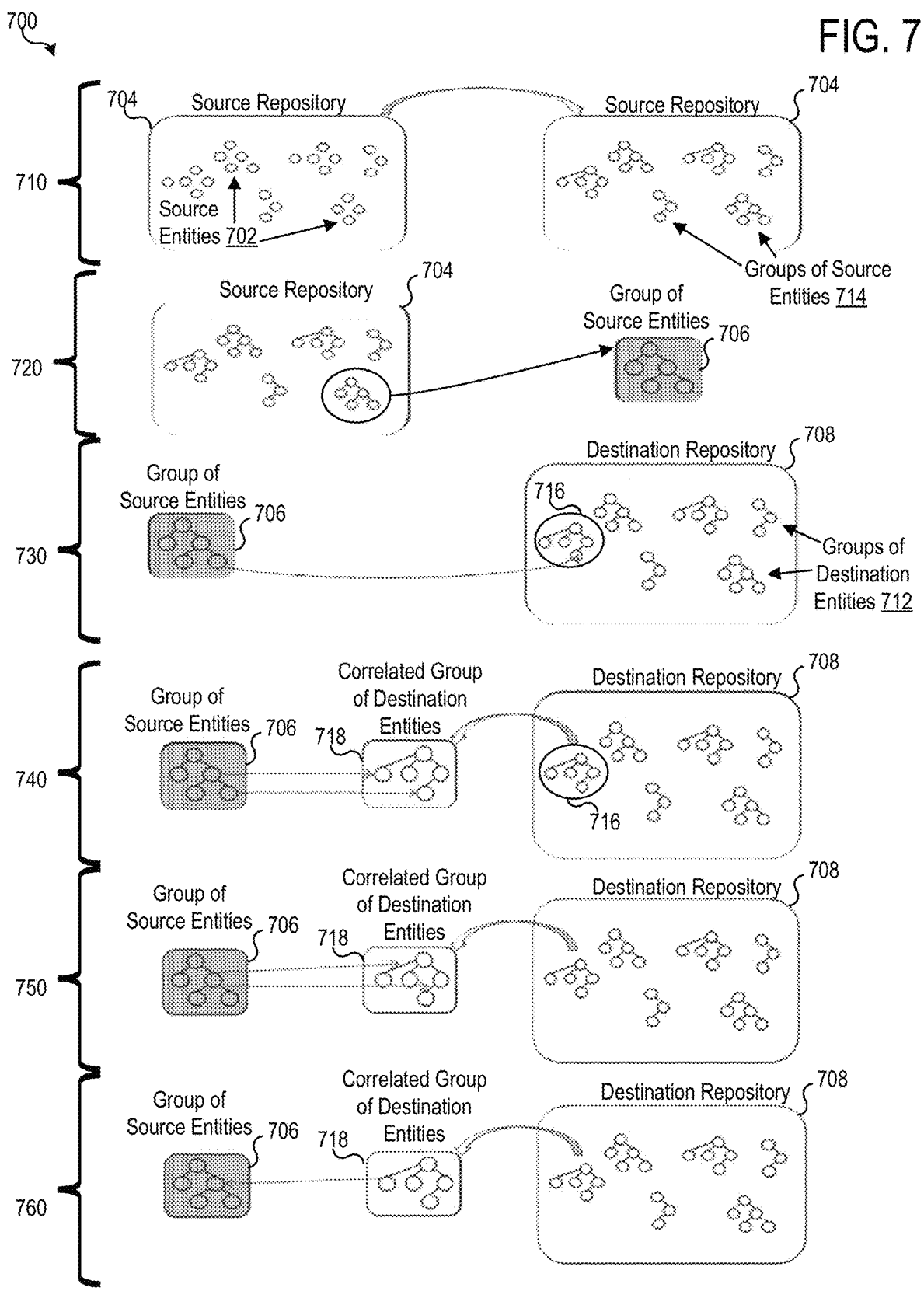
FIG. 7 is a sequence diagram illustrating a process for correlating groups of entities according to an embodiment of the present invention.
Figure 8:
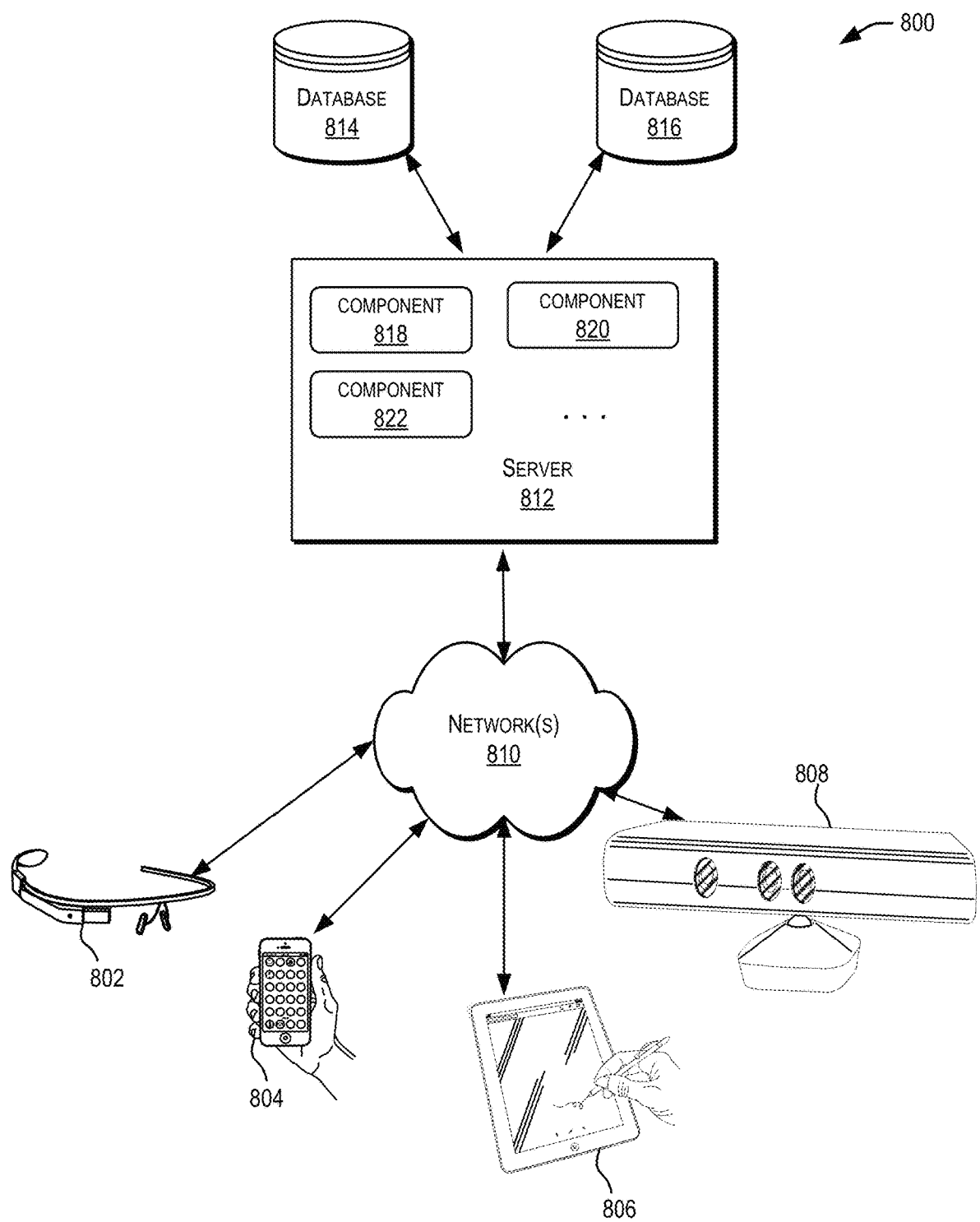
FIG. 8 depicts a simplified diagram of a distributed system for implementing one of the embodiments.

FIG. 3 shows a relationship between an entity and types of entities according to an embodiment of the present invention. FIG. 4 shows a data structure of a domain and information stored in association with the domain according to an embodiment of the present invention. FIG. 5 shows a data structure of a model and information stored in association with the model according to an embodiment of the present invention. In certain embodiments, the data structures shown in each of FIGS. 4 and 5 can store information about a group of entities in the repository system. With reference to FIGS. 7 and 8, techniques are described for determining a correlation between entities in a repository system.

In some embodiments, a group of entities can be a collection of logically related data corresponding to objects in the repository system. The repository system may store logically related data, such as a group of entities corresponding to a group of objects based on a relationship between one or more attributes in the data corresponding to each object in the group of objects. The groups of entities enable the repository system to organize data, such as metadata, which can change over time. In some embodiments, a group of entities may correspond to a domain of entities or a model of entities. Entities associated with a group can be managed according to a hierarchical order. A root entity in the group can have an identifier that matches the identifier (e.g., UUID) of the group. FIG. 4 shows a structure of a domain of entities and information stored in association with the domain according to an embodiment of the present invention. FIG. 5 shows a data structure of a model of entities and information stored in association with the model according to an embodiment of the present invention.

Now returning to FIG. 3, examples are shown of data structures that can be implemented in a repository system (e.g., the repository system 110) to store data (e.g., metadata) about objects in a computing environment. As explained above, the repository system can store information about objects including their attributes in various different data structures (or "entities"). An entity may include without restriction a linked list, a record, a hash table, an array, any data structure, or the like. Information about an object may be stored on one or more entities within the repository. A single entity may store information about one or more objects in a computing environment. An entity may be associated with an entity type, which corresponds to one or more types of objects. A type of an object may be based on an attribute of an object, a function associated with an object, information about the object, a group to which an object belongs, or combinations thereof. The repository system can retrieve at least one entity based on an object and/or a type of object requested by a user. In the example shown in FIG. 3, an entity is represented by an entity instance 310.

The repository system can manage a collection of entity instances 310 in a data structure 305 ("an instance"). The instance 305 can store information identifying one or more entity instances 310 stored in the repository system.

In certain embodiments, an entity instance, e.g., the entity instance 310, can be based on an entity type 315. The entity type 315 can be data structure for storing data about a particular type of entity. A type of entity can correspond to a type of object. The data structure of the entity type 315 can include one or more attributes for the particular type of object. The repository system can create an entity instance to store data for each different object that is of a type of object that corresponds to a particular entity type (e.g., the entity type 315). An entity instance 310 can store a value corresponding to each attribute defined by the entity type 315.

The entity type 315 can have an association with one or more other types 320. Each type 320 can be type extension corresponding to a data structure for storing additional data (e.g., attributes) about an entity, which has the entity type 315. In some embodiments, the additional data can include an attribute stored by the entity type 315 having an association with the type 320. A type extension can augment the entity type 315 that are associated with the type 320. The type 320 can be associated with multiple entity types that are being extended to include the attributes of the type 320. The type 320 can have an association with one or more other types, each of which can have its own type extension for storing additional data about an entity type, e.g., the entity type 315. When a first type is associated with a second type as a child of the second type, the attributes of the first type can be included with the attributes of the second type. An entity type that has an association with a type can include the attributes of the other types that are related to the type.

The instance 305 can include information (e.g., an attribute) indicating the entity instances 310 that are related. In certain embodiments, the instance 305 can indicate one or more data structures 335 ("relationship instances") that have a relationship with an entity instance, such as the entity instance 310. Each relationship instance 335 can correspond to a different entity instance that includes data about a different type of object. Each relationship instance 335 can indicate one or more other entity instances (e.g., the entity instance 310) to which it has a relationship. In some embodiments, the relationship instance 335 can indicate a data structure 340 ("an end"), which includes information indicating a relationship with the entity instance 310.

The relationship instance 335 can have a data structure to store data about an object. The data structure for the relationship instance 335 can be based on a type of object corresponding to the relationship instance 335. In some embodiments, the relationship instance 335 can be an entity instance of an object that is different from the entity instance 310. The data structure of the relationship instance 335 can be based on a relationship type 330. The relationship type 330 can be data structure for storing data the relationship between the relationship instance 335 and other entity instances, e.g., the entity instance 310. The relationship type 330 can have an association with one or more other extended types, such as the type 320. The type 320 can be data structure, which includes data or attributes in addition to the relationship type 330 corresponding to the relationship instance 335.

Each relationship type 320 can indicate a relationship with one or more other entity types 315. A relationship between the relationship type 320 and the entity type 315 can be defined by an end definition 325. The end definition 325 can indicate a data structure for storing attributes identifying the relationship between relationship instances having the relationship type 320 and entity instances having the entity type 315. The end 340 can store values for the attributes of the relationship between the relationship instance 335 and the entity instance 310. The value of the attributes can be stored in a manner defined by the end definition 340 for relationships between the relationship instances 335 having the relationship type and the entity instances 310 having the relationship type 315.

Now turning to FIG. 4, a data structure of a domain and information stored in association with the domain according to an embodiment of the present invention. FIG. 4 shows examples of data structures that can be implemented in a repository system (e.g., the repository system 110) to manage information about a domain stored in the repository system.

A domain can represent a group of objects based on one or more criterion, e.g., a type of object or an attribute of an object. The domain may be based on entities that are stored in the repository system. A domain model can define the criteria for the domain. In certain embodiments, a domain model may be based on entity types, types, attributes, relationship types, data types, other criteria about entities, or combinations thereof, which identify the type of objects to be included in the domain.

The repository system can implement a data structure, such as a domain 405, to manage information about a domain. The domain 405 can identify information about the domain, such as a name (e.g., a namespace 410) and other attributes associated with the domain 405. In some embodiments, the namespace 410 can include an identifier that uniquely identifies the domain from other domains. The namespace 410 can be the domain's name. The namespace 410 can define the scope for naming types, type extensions, and data types. In certain embodiments, the namespace 410 of the domain 405 can be based on a qualified name 435 (QName) stored in association with the domain 405. The qualified name 435 can be used instead of a UUID to further uniquely associate one or more type-level constructs 440 with the domain 405. The qualified name 435 can be used instead of a UUID to uniquely identify the domain. The qualified name 435 can consist of a namespace part and a local part. Each type-level construct 440 can correspond to a type-related data structure, such as the entity type 415 or the relationship type 430. The domain can be based on the type-level constructs 440 that are included in the repository system. In some embodiments, the namespace 410 of the domain 405 can be based on the qualified name 435 determined from one or more type-level constructs in the domain.

In certain embodiments, a domain can include a version (e.g., a domain version) that identifies a version of the domain. The version can be associated with changes to the domain, such that a new version of the domain can correspond to certain changes to the domain 405. The repository system can store a domain version 415, which can be a data structure that includes information about a version of the domain 405. A specific version of a domain can be identified by a version identifier 430 (e.g., a domain version). The domain version 415 can be included in the domain 405 or can be stored in association with the domain 405. The domain version 415 can include a namespace 420 that is based on the namespace of the domain 405. The namespace 420 can be based on the version 430 of the domain. In certain embodiments, the domain version 415 can include the type-level constructs 440, such as the entity type 415, the type 420, and other data types. Each of the type-level constructs 440 can be associated with a domain version 415 to which it is associated. The namespace 410 can be associated with each domain version 415. The namespace 410 can include a version identifier 430. Since domain versions are associated with a domain, the version of the namespace can be derived from the domain version to which the domain is associated.

FIG. 5 shows a data structure of a model and information stored in association with the model according to an embodiment of the present invention. Specifically, FIG. 5 shows examples of data structures that can be implemented in a repository system (e.g., the repository system 110) to manage information about a model of entities in the repository system.

A model 505 can be a container of logically related instances 515. In some embodiments, the model 505 can have a structure of a graph identifying the relationships between instances 515 in the model 505. The instance 515 can be an entity instance (e.g., the entity instance 315), a relationship instance (e.g., the relationship instance 335), another instance in the repository system, or a combination thereof. The instance 515 can be a data structure that includes information about a resource or an object in a computing environment. The instance 515 can identify an actual data structure that represents the instances. The instance 515 can indicate attributes about a resource or an object, including an identifier (e.g., a UUID).

The model 505 can include or be associated with a model descriptor 510. The model descriptor 510 can include information indicating attributes of the model 505. The model 505 can include a name. The model 505 can include one or a combination of a namespace, a UUID, a timestamp, or other attributes that define the model 505. The model descriptor 510 can include criteria indicating the types of instances 515 that can be associated with the model.

Figure 6:
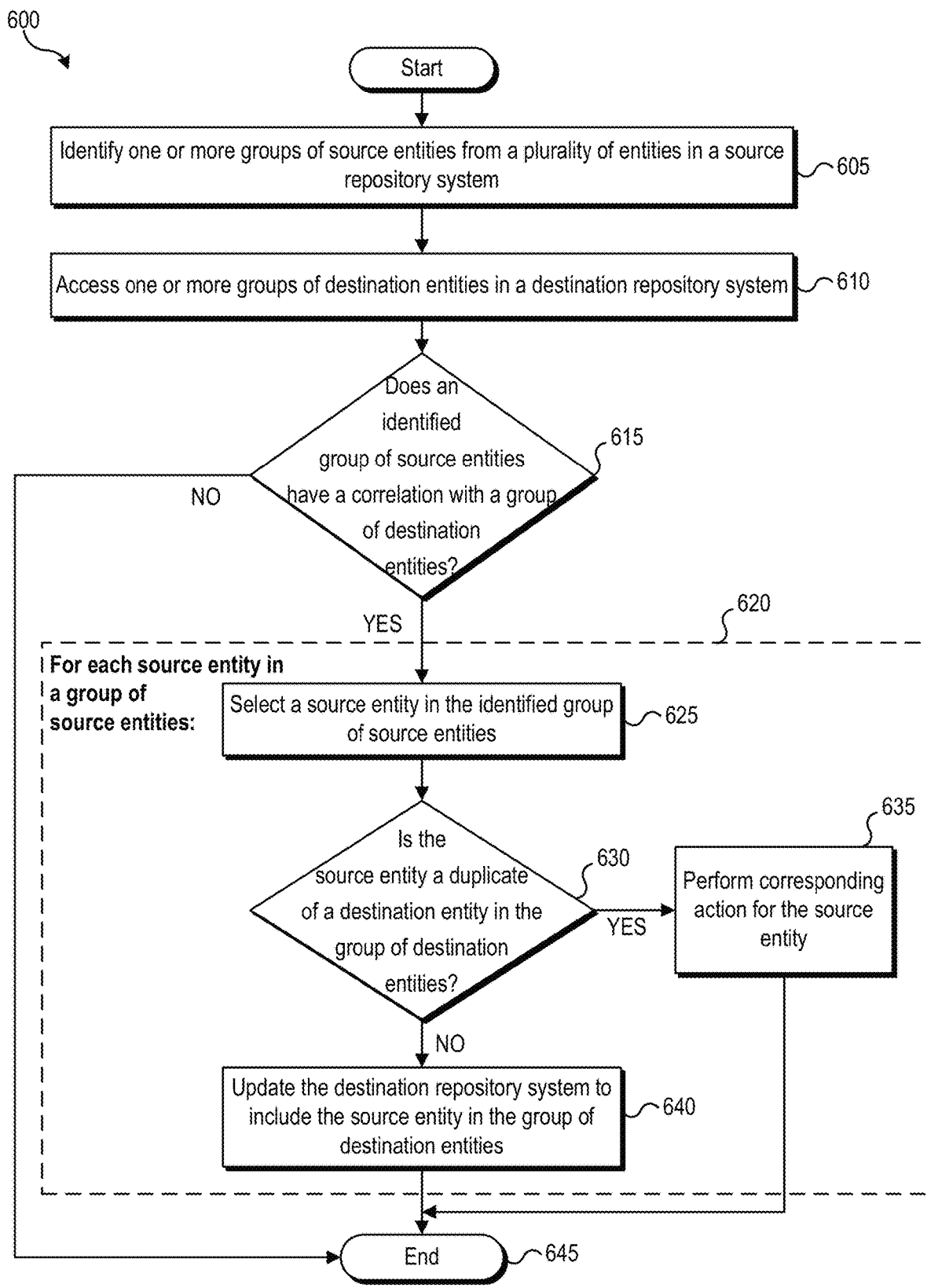
FIG. 6 is a flowchart illustrating a process for correlating entities in a repository system according to an embodiment of the present invention.

FIG. 6 is a flowchart illustrating a process 600 for determining a correlation between entities in a repository system according to an embodiment of the present invention. The process 600 can include identifying one or more entities ("source entities") from one or more repository systems ("source repository systems") and can include determining whether a correlation exists between the identified one or more objects corresponding to one or more source entities and one or more objects corresponding to one or more entities ("destination entities") in a destination repository system. Based upon determination that a correlation exists, the process 600 can include identifying an object corresponding to a source entity that is different from an object corresponding to a destination entity and the process 600 can include updating the destination entity to include information corresponding to the differences in the object. As explained above, an entity can include information about one or more entities. For purposes of illustration, the examples described below are based on an entity storing information about a single object. In some embodiments, the process 600 can include performing one or more additional actions (e.g., remove) on each source entity that is a duplicate of a destination entity in the destination repository system with which a correlation exists.

In certain embodiments, source entities in a source repository system can associated as with a group of entities ("a group of source entities") and destination entities in a destination repository system can be associated with a group of entities ("a group of destination entities"). A group of entities can include one or more entities. In some embodiments, a group of source entities can correspond to a domain of entities or a group of entities based on a model, or the group of source entities can be associated with an asset. A group of destination entities can correspond a domain of entities or a group of entities based on a model, or the group of destination entities can be associated with an asset.

Beginning at block 605, the process 600 can include identifying one or more groups of source entities from a plurality of entities ("source entities") in a source repository system (e.g., the source repository system 170). In certain embodiments, the source entities can be stored in one of multiple source repositories (e.g., a database, a memory device, etc.) of the source repository system.

In some embodiments, a group of source entities can be identified in a source repository system by having an association with one or more similar or related attributes (e.g., a correlation identifier). For example, each entity of a group of source entities can be identified by having entities, each of which has an association with a particular entity type (e.g., a service entity type). In some embodiments, a group of source entities can be identified in a source repository system by having entities that associated as a domain of entities. The domain can be a group of entities defined based on one or more attributes of entities that satisfy a criterion. In another example, each entity of a source group of entities can be identified by having one or more attributes defined by a domain model (e.g., a web service domain). In this example, each entity of the source group of entities can have an attribute that associates the entity as being related or associated with a domain corresponding to the domain model. The one or more groups of source entities can already exist in the source repository system and can be identified based on an identifier associated with each of the one or more source groups.

At block 610, the process 600 can include accessing one or more groups of destination entities in a destination repository system (e.g., the repository system 110). To access the one or more groups of destination entities, the process 600 can include locating, in the destination repository system, the one or more groups of destination entities based on criteria (e.g., an attribute of an entity type) and can include retrieving the one or more groups of entities that are located based on the criteria. For example, a group of destination entities can be associated with a domain defined by one or more attributes. In some embodiments, accessing the group of destination entities can include searching the destination repository system for entities that satisfy one or more criterion defining a group of destination entities (e.g., a domain or a model of entities) and retrieving those destination entities that satisfy the criteria.

At block 615, the process 600 can include determining whether a group of source entities has a correlation with a group of destination entities. A group of source entities can be the group of source entities identified at block 605. Upon determining whether a group of source entities has a correlation with a group of destination entities, the process 600 can proceed to block 620 to perform blocks 625-640 for process 600. Blocks 625-640 can be performed iteratively for each source entity in the group of source entities, which has a correlation with a group of destination entities.

For an identified group of source entities, the process 600 can include implementing techniques for correlation to determine whether an identified group of source entities has a correlation with a group of destination entities. For example, using one correlation technique, the process 600 can include determining whether an attribute (e.g., a correlation identifier) associated with a group of source entities matches an attribute of one or more groups of destination entities accessed from the destination repository system. A correlation identifier can be previously associated with a group of entities (e.g., a group of source entities or a group of destination entities) having entities that are related or similar based on criteria defined as a group (e.g., a domain or a model). A correlation can exist when an attribute of the group of source entities matches an attribute of the group of destination entities that are being compared for correlation. In another example, the process 600 can include determining whether a group of source entities and a group of destination entities both have an association with an identical attribute. A correlation can exist whether both the group of source entities and the group of destination entities has an identical attribute.

In another example, a correlation may be determined by determining whether one or more of the source entities in the group of source entities has a correlation with one or more of the destination entities in the group of destination entities. In some embodiments, a source entity can have a correlation with one or more destination entities when one or more of their respective attributes are similar or related. Thus, a correlation can exist when a group of source entities has a source entity with an attribute that is similar or related to an attribute of a destination entity in the group of destination entities.

In certain embodiments, the process 600 can include determining a correlation between groups of entities where the groups are defined as an asset, a model, a domain, or other a group of entities based on a combination of attributes. In such embodiments, the correlation can be performed by determining whether an attribute or an identifier of each of the groups match with each other or have a relationship with each other. Certain embodiments of correlation techniques are described below with reference to 7.

In block 620, the process 600 can include implementing the blocks 625-640 for each source entity in the group of source entities that has a correlation with a group of destination entities. Each source entity can be processed within block 620 to determine whether it is different (e.g., not a duplicate) from all destination entities in the group of destination entities that have a correlation with the group of source entities. In other words, a determination can be made whether each source entity is not a duplicate of all destination entities in the group of destination entities. The process 600 can include updating the group of destination entities with a source entity when it is not a duplicate of all destination entities in the group of destination entities.

At block 625, the process 600 can include selecting a source entity from the group of source entities to perform an iteration of the process 600 at block 620. At block 630, the process 600 can include determining whether the selected source entity is a duplicate of any destination entity in the group of destination entities identified as having a correlation with the group of source entities. In other words, the process 600 can include determining whether the selected source entity is not different from all destination entities in the group of destination entities. A source entity can be identified as being different from a destination entity based on one or more criteria. In some embodiments, the criteria can include one or more attributes of an entity. A source entity can compared to each of the destination entities to determine whether the entities match based on the criteria. A source entity can be a duplicate when it matches one or more attributes. For example, a source entity can be a duplicate of a destination entity when the source entity is associated with a correlation identifier and a key type, the both of which are associated with a destination entity in the group of destination entities.

Upon determining that the selected source entity is a duplicate of a destination entity in the group of destination entities, then the process 600 can proceed to block 635 where it can perform a corresponding action for the source entity. Upon determining that the selected source entity is not a duplicate of a destination entity in the group of destination entities, then the process 600 can proceed to block 640 where it can update the destination repository system to include the selected source entity.

At block 635, a corresponding action can be performed for the selected source entity. Such an action can include preventing the selected source entity from being updated in the group of destination entities. In some embodiments, the selected source entity may include other information (e.g., associated attributes) that is different from the information included in the destination entity identified at block 630 as a duplicate. In such embodiments, the identified duplicate destination entity can be updated with the differences identified in the source entity. For example, the duplicate destination entity can be replaced with the selected source entity. Upon performing the corresponding action, the process 600 has completed performing actions for the selected source entity. The process 600 can include implementing the blocks 625-640 for another source entity, if any remain to be processed, or the process 600 can proceed to end at block 645.

Now returning to block 630, upon determining that selected source entity is not a duplicate of a destination entity, the process 600 can include updating the destination repository system to include the selected source entity. For example, the process 600 can include storing the selected source entity in the destination repository and associating the selected source entity with one or more attributes (e.g., a correlation identifier) associated with the group of destination entities. Upon updating the destination repository system, the process 600 can include implementing the blocks 625-640 for another source entity, if any remain to be selected, or the process 600 can proceed to end at block 645.

In certain embodiments, the process 600 can be implemented by some embodiments of the repository system 110. The repository system 110 can implement the process 600 to determine whether a group of source entities 172 has a correlation with a group of destination entities 162. Based on determining that a correlation exists, the process 600 can include determining whether any source entities in the group of source entities 172 are not duplicates (e.g., different) of any destination entity in the group of destination entities 162, correlated with the group of source entities 172. Based on the determination, the process 600 can accordingly update the destination repository store 160 of the repository system 110 with each selected source entity that is not a duplicate. In some embodiments, source entities that are duplicates can be used to update the destination repository store 160 with the different attribute of the selected source entity.

Process 600 can be performed in an iterative manner for each group of source entities identifies in a source repository system. In some embodiments, a group of source entities can have a correlation with multiple groups of destination entities. In such embodiments, process 600 can perform blocks 625-640 within block 620 in an iterative manner for each group of destination entities identified as having a correlation with the group of source entities. It will be appreciated that process 600 is illustrative and that variations and modifications are possible. Action or operations described for process 600 as sequential may be executed in parallel and/or order of operations may be varied, and operations may be modified, combined, added or omitted. For example, the process 600 may be iteratively performed as one or both of a source repository system or a destination repository system is updated.

FIG. 7 is a sequence diagram illustrating a process 700 for correlating groups of entities according to an embodiment of the present invention. In particular, the process 700 can include determining a correlation between a group of entities in a source repository system 704 and a group of entities in a destination repository system 708. For purposes of illustration, a group of entities stores information corresponding to a group of objects, where each entity stores information corresponding to a single object in the group of objects. An entity can store one or more attributes, each corresponding to information about an attribute of an object corresponding to the entity. Process 700 can include modifying the destination repository system 708 to store one or more source entities 702 in the correlated group of entities that are not a duplicate of any destination entity associated with a correlated group of destination entities stored in the destination repository system 708.

Beginning at block 710, process 700 can include identifying one or more groups of source entities 714 in a source repository 704 (e.g., the source repository system 170). The source repository 704 may include one or more source entities 702. Each group of source entities 714 can be identified based on the source entities 702 that have one or more attributes (e.g., an identifier) that are similar or related. In some embodiments, a group of source entities 714 can be identified based on the source entities that are each associated with a correlation identifier. The correlation identifier can correspond to a type of source entity. Each source entity of a group of source entities can include one or more other attributes that are not identical or related.

In certain embodiments, one or more of the groups of source entities 714 can be a domain of source entities, an asset of source entities, a model of source entities, or any other type of grouping of source entities. For example, one of the groups of source entities can be identified based on a domain model that is defined by having one or more attributes (e.g., a group correlation identifier). The domain model can be associated with attributes that define a relationship of source entities in the domain model.

At block 720, process 700 can include selecting a group of source entities 706 to determine a correlation with a destination repository. For example, a group of source entities 706 can be chosen from the group of source entities 714 in the source repository 704.

At block 730, process 700 can include determining whether the group of source entities 706 has a correlation with one or more groups of destination entities 712 in a destination repository 708. The process 700 can include determining a correlation by comparing the group of source entities 706 to the one or more groups of destination entities 712. In some embodiments, one or more attributes of the group of source entities 706 can be compared to the attributes of the one or more groups of destination entities 712. A correlation can be identified when the group of source entities 706 is associated with at least one attribute that is related or matches to an attribute associated with one of the one or more groups of destination entities 712. For example, a correlation can exist between the group of source entities 706 and a group of destination entities 712 when an identifier (e.g., a UUID) of the group of source entities 706 matches an identifier of the group of destination entities 712. In some embodiments, the correlation can be identified when the group of source entities 706 is associated with an attribute having a correlation identifier that matches an attribute of the group of destination entities 712.

In certain embodiments where the group of source entities 706 is a domain of source entities, the correlation can be determined based on an attribute of the domain of source entities (e.g., a domain key type) being compared to the group of destination entities 712. A correlation can be identified when a match is detected between the attributes of the domains being compared. One or more groups of destination entities, e.g., the group of destination entities 716, can be identified as having a correlation with the group of source entities 706.

At block 740, the process 700 can include identifying one or more source entities in the group of source entities 706 that are a duplicate of any destination entity in the group of destination entities 716. In some embodiments, the process 700 may generate a group of destination entities ("correlated group of destination entities") that is a copy of the group of destination entities 716 identified as having a correlation with the group of source entities 706. As will be described further below, the correlated group of destination entities 718 may be used to determine the source entities in the correlated group of source entities 706 that are different. The correlated group of destination entities 718 may be updated with source entities from the group of source entities 706 and then merged with the destination repository 708.

A source entity may not be a duplicate of a destination entity where the source entity and the destination entity do not have attributes in common. A source entity can be identified as being different from and not a duplicate of a destination entity based on one or more criterion. In some embodiments, a criterion can be based on one or more attributes of an entity. A source entity in the group of source entities 706 can be compared to each of the destination entities in the correlated group of destination entities 718 to determine whether the compared entities match based on a criterion. A source entity can be a duplicate when it has an attribute that matches one or more attributes of a destination entity in the correlated group of destination entities 718. For example, a source entity can be a duplicate of a destination entity when the source entity is associated with a correlation identifier and a key type, the both of which can associated with a destination entity in the group of destination entities 716.

The process 700 can include merging duplicate source entities into the correlated group of destination entities 718. Each source entity that is a duplicate of a destination entity in the correlated group of destination entities can be merged with the corresponding duplicate destination entity. In some embodiments, the destination entity that is a duplicate of a source entity can be replaced with the duplicate source entity. In some embodiments, the information in the duplicate source entity can be merged with the duplicate destination entity such that the differences can be updated in the destination entity.

At block 750, the process 700 can include determining whether a duplicate source entity stores information indicating a relationship with other entities. The process 700 may determine whether such relationships exist and compare with any existing relationships of the matching duplicate destination entity. Any such differences in their relationships may be updated using with the source entity or merged.

At block 760, the process 700 includes removing duplicate source entities from the group of source entities 706. The process 700 further includes updating the correlated group of destination entities to reference the new source entities in the group of source entities 706. The process 700 may then update the destination repository 708 with the correlated group of destination entities such that information in the destination entities of the correlated group of destination entities 718 is stored in the destination repository 708.

In certain embodiments, the process 700 can be implemented by some embodiments of the repository system 110. The process 700 can be performed in an iterative manner for each group of source entities identifies in a source repository system. In some embodiments, a group of source entities can have a correlation with multiple groups of destination entities. In such embodiments, the process 700 can perform blocks 720-760 in an iterative manner for each group of source entities 706 that are identified in the source repository system 704. It will be appreciated that the process 700 is illustrative and that variations and modifications are possible. Action or operations described for the process 700 as sequential may be executed in parallel and/or order of operations may be varied, and operations may be modified, combined, added or omitted. For example, the process 700 may be iteratively performed as one or both of a source repository system or a destination repository system is updated.

FIG. 8 depicts a simplified diagram of a distributed system 800 for implementing one of the embodiments. The distributed system 800 can implement the computing environment 100 and/or the repository system 110. The distributed system 800 can implement the process 600 of FIG. 6 and/or the process 700 of FIG. 7. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. In certain embodiments, the one or more client computing devices 802-808 can include the client system 102 of FIG. 1. Server 812 may be communicatively coupled with remote client computing devices 802, 804, 806, and 808 via network 810. The server 812 can include the repository system 110.

In various embodiments, server 812 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a PDA) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE)

802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization. One or more flexible pools of logical storage devices can be virtualized to maintain virtual storage devices for the server. Virtual networks can be controlled by server 812 using software defined networking. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP servers, FTP servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
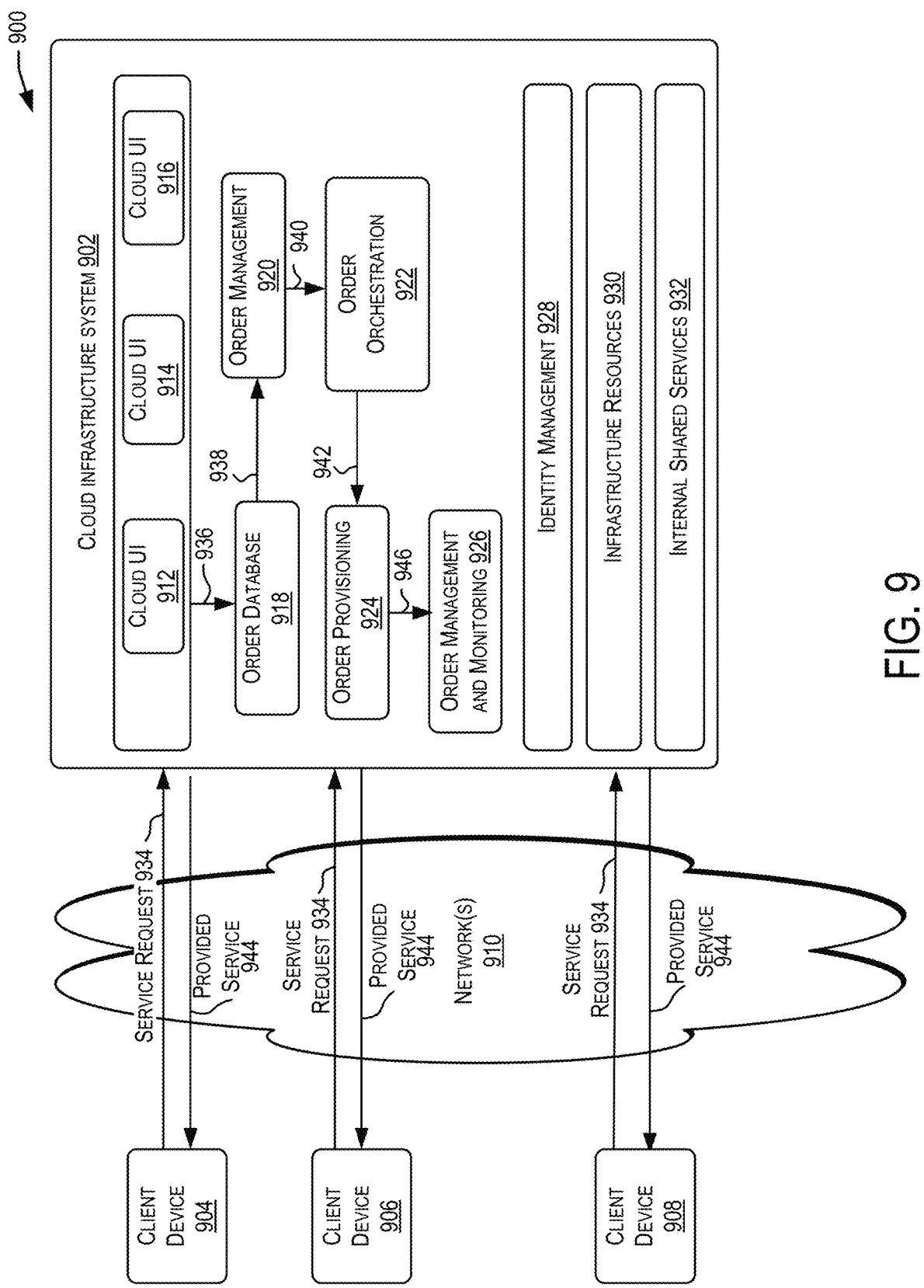
FIG. 9 is a simplified block diagram of components of a system environment by which services provided by the components of an embodiment system may be offered as cloud services, in accordance with an embodiment of the present disclosure.

FIG. 9 is a simplified block diagram of one or more components of a system environment 900 by which services provided by one or more components of an embodiment system may be offered as cloud services, in accordance with an embodiment of the present disclosure. The system environment 900 can include or implement the computing environment 100 of FIG. 1 and/or the repository system 110. The system environment 900 can implement the process 600 of FIG. 6 and/or the process 700 of FIG. 7. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. For example, the cloud infrastructure system 902 can include or implement the repository system 110 of FIGS. 1 and 2. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.). Identity management module 928 may also include the management of descriptive information about each customer and about how and by whom that descriptive information can be accessed and modified.

Figure 10:
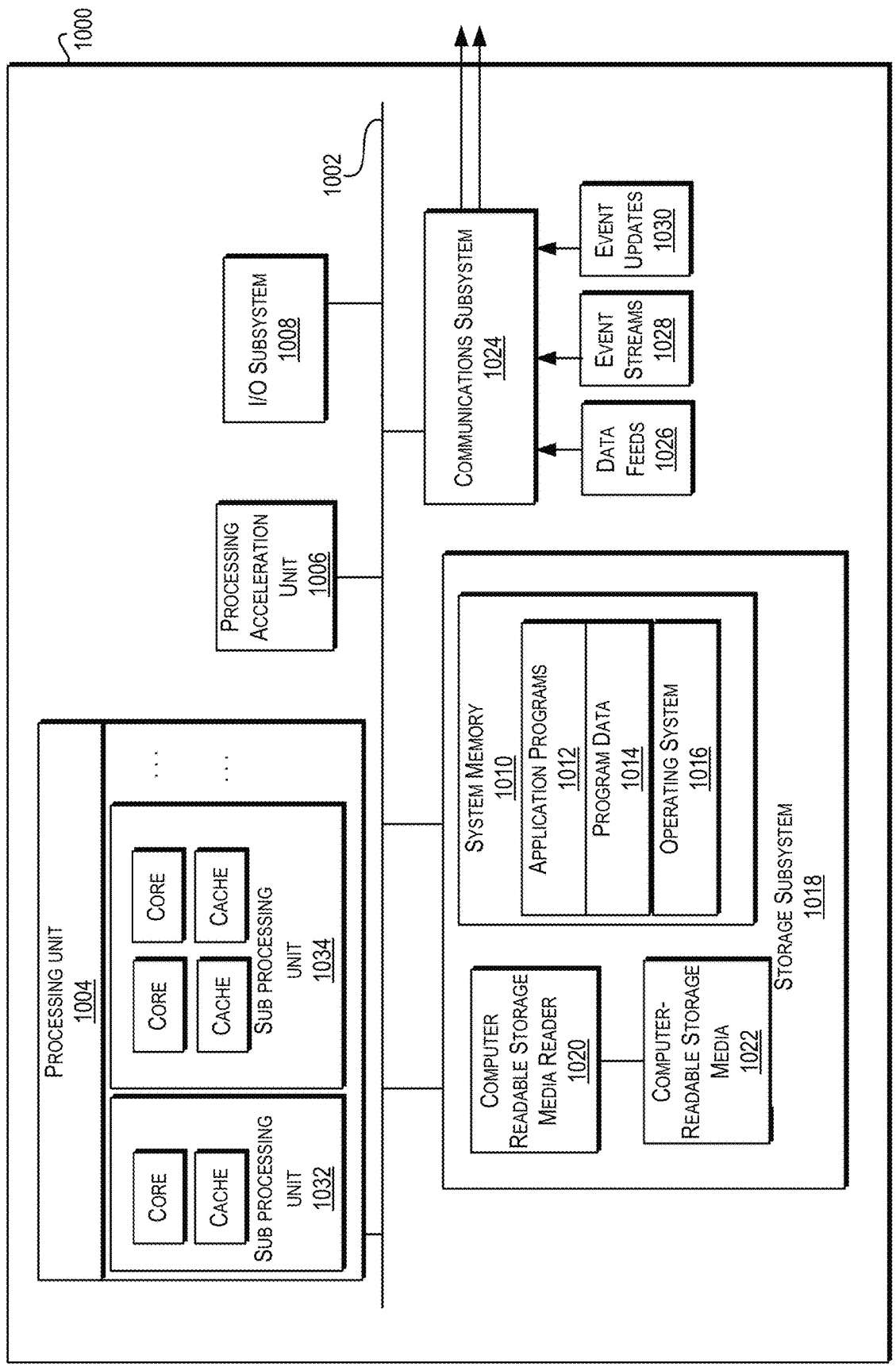
FIG. 10 illustrates an exemplary computer system, in which various embodiments of the present invention may be implemented.

FIG. 10 illustrates an exemplary computer system 1000, in which various embodiments of the present invention may be implemented. The system 1000 may be used to implement any of the computer systems described above. For example, all or some of the elements of the computing environment 100 of FIG. 1 and the repository system 110 can be included or implemented in the system 1000. The system 1000 can implement the process 600 of FIG. 6 and/or the process 700 of FIG. 7. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/ or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

identifying, by a computing system, a first group of entities in a first repository system that is implemented as a source repository based on a first relationship attribute, the first group of entities comprising a first plurality of entities in the first repository system, wherein the first group of entities store metadata corresponding to a group of objects, wherein the first group of entities are separate data structures from the group of objects, wherein each entity of the first plurality of entities is a separate data structure storing the metadata corresponding to an object of the group of objects, wherein the first group of entities is associated with first data in a first instance data structure that is stored in the first repository system and that identifies each entity of the first plurality of entities, and wherein the first data further includes the first relationship attribute identifying a first relationship between each entity of the first plurality of entities;

accessing, by the computing system, a second group of entities in a second repository system that is implemented as a destination repository based on a second relationship attribute, the second group of entities comprising a second plurality of entities in the second repository system, wherein each entity of the second plurality of entities is a separate data structure storing metadata about one or more objects, wherein the second repository system is separate from the first repository system, wherein the second group of entities is associated with second data in a second instance data structure that is stored in the second repository system and that identifies each entity of the second plurality of entities, and wherein the second data further includes the second relationship attribute identifying a second relationship between each entity of the second plurality of entities;

determining, by the computing system, whether the first group of entities has a correlation with the second group of entities, wherein the correlation is determined when the first group of entities is associated with at least one attribute having a correlation identifier that is related or matches to an attribute associated with the second group of entities; and based on determining that the first group of entities has the correlation with the second group of entities:

generating a correlated group of destination entities that is a copy of the second group of entities determined as having a correlation with the first group of entities, wherein the generating creates the correlated group of destination entities as an actual copy of the second group of entities determined as having a correlation with the first group of entities and not just an identification of the correlated group of destination entities as a duplicate of the second group of entities;

identifying duplicate one or more source entities in the first group of entities that are a duplicate of any destination entity in the correlated group of destination entities, wherein a source entity is a duplicate when the source entity has criterion based on one or more attributes that matches criterion of a destination entity in the correlated group of destination entities;

merging the identified duplicate one or more source entities into the correlated group of destination entities, wherein the merging includes replacing each of the destination entities in the correlated group of destination entities with the source entity identified as being a duplicate of the destination entity or merging information in each of the destination entities in the correlated group of destination entities with information in the source entity identified as being a duplicate of the destination entity; and updating, by the computing system, the second repository system to include the correlated group of destination entities such that the second repository system now includes the identified duplicate one or more source entities.

2. The method of claim 1, wherein the first group of entities is identified in the first data of the first instance data structure stored in the first repository system based on an entity type, and wherein each entity in the first group of entities is associated with the entity type.

3. The method of claim 1, wherein the first relationship attribute is, and wherein each entity in the first group of entities has the first relationship attribute corresponding to the attribute of the domain.

4. The method of claim 1, wherein the first group of entities is associated with a first model descriptor of a first domain model for grouping the first plurality of entities into the first group of entities.

5. The method of claim 1, further comprising based on determining that the first group of entities has the correlation with the second group of entities, for each entity in the first group of entities:

merging source entity in the first group of entities with the correlated group of destination entities upon determining information from the source entity in the first group of entities is not included in at least one destination entity in the correlated group of destination entities; and updating, by the computing system, the second repository system to include the correlated group of destination entities such that the second repository now includes the source entity that has information that is not included in at least one destination entity of the correlated group of destination entities.

6. The method of claim 1, wherein updating the second repository system to include the correlated group of destination entities includes:

determining a source entity in the first group of entities that includes information indicating a relationship with another source entity in the first group of entities; and updating at least one destination entity in the group of destination entities determined to be correlated with the source entity in the first group of entities, with the information indicating the relationship.

7. A system comprising:

one or more processors; and one or more memory devices coupled to the one or more processors, the one or more memory devices containing instructions that, when executed on the one or more processors, cause the one or more processors to:

identify a first group of entities in a first repository system that is implemented as a source repository based on a first relationship attribute, the first group of entities comprising a first plurality of entities in the first repository system, wherein the first group of entities store metadata corresponding to a group of objects, wherein the first group of entities are separate data structures from the group of objects, wherein each entity of the first plurality of entities is a separate data structure storing the metadata corresponding to an object of the group of objects, wherein the first group of entities is associated with first data in a first instance data structure that is stored in the first repository system and that identifies each entity of the first plurality of entities, and wherein the first data further includes the first relationship attribute identifying a first relationship between each entity of the first plurality of entities;

access a second group of entities in a second repository system that is implemented as a destination repository based on a second relationship attribute, the second group of entities comprising a second plurality of entities in the second repository system, wherein each entity of the second plurality of entities is a separate data structure storing metadata about one or more objects, wherein the second repository system is separate from the first repository system, wherein the second group of entities is associated with second data in a second instance data structure that is stored in the second repository system and that identifies each entity of the second plurality of entities, and wherein the second data further includes the second relationship attribute identifying a second relationship between each entity of the second plurality of entities;

determine whether the first group of entities has a correlation with the second group of entities, wherein the correlation is determined when the first group of entities is associated with at least one attribute having a correlation identifier that is related or matches to an attribute associated with the second group of entities; and based on determining that the first group of entities has a correlation with the second group of entities:

generate a correlated group of destination entities that is a copy of the second group of entities determined as having a correlation with the first group of entities, wherein the generating creates the correlated group of destination entities as an actual copy of the second group of entities determined as having a correlation with the first group of entities and not just an identification of the correlated group of destination entities as a duplicate of the second group of entities;

identify one or more source entities in the first group of entities that are a duplicate of any destination entity in the correlated group of destination entities, wherein a source entity is a duplicate when the source entity has criterion based on one or more attributes that matches criterion of a destination entity in the correlated group of destination entities;

merge the identified duplicate one or more source entities into the correlated group of destination entities, wherein the merging includes replacing each of the destination entities in the correlated group of destination entities with the source entity identified as being a duplicate of the destination entity or merging information in each of the destination entities in the correlated group of destination entities with information in the source entity identified as being a duplicate of the destination entity; and update, by the computing system, the second repository system to include the correlated group of destination entities, which includes the merged one or more source entities.

8. The system of claim 7, wherein the instructions, when executed on the one or more processors, further cause the one or more processors to:

when updating the second repository system to include the correlated group of destination entities:

determine a source entity in the first group of entities that includes information indicating a relationship with another source entity in the first group of entities; and update at least one destination entity in the group of destination entities determined to be correlated with the source entity in the first group of entities, with the information indicating the relationship.

9. A non-transitory computer-readable memory storing a set of instructions that, when executed by one or more processors, causes the one or more processors to:

identify a first group of entities in a first repository system that is implemented as a source repository based on a first relationship attribute, the first group of entities comprising a first plurality of entities in the first repository system, wherein the first group of entities store metadata corresponding to a group of objects, wherein the first group of entities are separate data structures from the group of objects, wherein each entity of the first plurality of entities is a separate data structure storing the metadata corresponding to an object of the group of objects, wherein the first group of entities is associated with first data in a first instance data structure that is stored in the first repository system and that identifies each entity of the first plurality of entities, and wherein the first data further includes the first relationship attribute identifying a first relationship between each entity of the first plurality of entities;

access a second group of entities in a second repository system that is implemented as a destination repository based on a second relationship attribute, the second group of entities comprising a second plurality of entities in the second repository system, wherein each entity of the second plurality of entities is a separate data structure storing metadata about one or more objects, wherein the second repository system is separate from the first repository system, wherein the second group of entities is associated with second data in a second instance data structure that is stored in the second repository system and that identifies each entity of the second plurality of entities, and wherein the second data further includes the second relationship attribute identifying a second relationship between each entity of the second plurality of entities;

determine whether the first group of entities has a correlation with the second group of entities, wherein the correlation is determined when the first group of entities is associated with at least one attribute having a correlation identifier that is related or matches to an attribute associated with the second group of entities; and based on determining that the first group of entities has a correlation with the second group of entities:

generate a correlated group of destination entities that is a copy of the second group of entities determined as having a correlation with the first group of entities, wherein the generating creates the correlated group of destination entities as an actual copy of the second group of entities determined as having a correlation with the first group of entities and not just an identification of the correlated group of destination entities as a duplicate of the second group of entities;

identify one or more source entities in the first group of entities that are a duplicate of any destination entity in the correlated group of destination entities, wherein a source entity is a duplicate when the source entity has criterion based on one or more attributes that matches criterion of a destination entity in the correlated group of destination entities;

merge the identified duplicate one or more source entities into the correlated group of destination entities, wherein the merging includes replacing each of the destination entities in the correlated group of destination entities with the source entity identified as being a duplicate of the destination entity or merging information in each of the destination entities in the correlated group of destination entities with information in the source entity identified as being a duplicate of the destination entity; and update, by the computing system, the second repository system to include the correlated group of destination entities, which includes the merged one or more source entities.

10. The non-transitory computer-readable memory of claim 9, wherein the first group of entities is identified in the first data of the first instance data structure stored on the first repository system based on an entity type, and wherein each entity in the first group of entities is associated with the entity type.

11. The non-transitory computer-readable memory of claim 9, wherein the one or more processors are cause to further:

merging source entity in the first group of entities with the correlated group of destination entities upon determining information from the source entity in the first group of entities is not included in at least one destination entity in the correlated group of destination entities; and updating, by the computing system, the second repository system to include the correlated group of destination entities such that the second repository now includes the source entity that has information that is not included in at least one destination entity of the correlated group of destination entities.

12. The method of claim 1, wherein the first relationship attribute is, and wherein each entity in the first group of entities has the first relationship attribute corresponding to the attribute of the domain.

13. The method of claim 12, wherein the second relationship attribute is, and the destination domain represents a group of objects based on the attribute, wherein each entity in the second group of entities has the second relationship attribute corresponding to the attribute of the destination domain.

14. The method of claim 13, wherein the determining the correlation includes comparing the first attribute of the first group of entities to the second attribute of the second group of entities, wherein the first attribute is the at least one attribute having the correlation identifier, and determining the first group of entities has the correlation with the second group of entities when the first attribute of the first group of entities matches the second attribute of the second group of entities.

* * * * *

UNITED STATES PATENT AND TRADEMARK OFFICE
CERTIFICATE OF CORRECTION

| | |
|---|---|
| PATENT NO. | : 10,614,048 B2 |
| APPLICATION NO. | : 14/484161 |
| DATED | : April 7, 2020 |
| INVENTOR(S) | : Dennis Fuglsang, Andrey Ozerov and David Keyes |

Page 1 of 1

It is certified that error appears in the above-identified patent and that said Letters Patent is hereby corrected as shown below:

In the Claims

Claim 1, Column 35 Line 68:
Delete "duplicate", therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*